(12) United States Patent
Ji

(10) Patent No.: US 11,921,625 B2
(45) Date of Patent: Mar. 5, 2024

(54) STORAGE DEVICE FOR GRAPH DATA

(71) Applicant: SAMSUNG ELECTRONICS CO., LTD., Suwon-si (KR)

(72) Inventor: Soo-Young Ji, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 17/752,004

(22) Filed: May 24, 2022

(65) Prior Publication Data

US 2023/0129606 A1  Apr. 27, 2023

(30) Foreign Application Priority Data

Oct. 26, 2021  (KR) .......................... 10-2021-0143213

(51) Int. Cl.
 *G06F 12/00* (2006.01)
 *G06F 12/02* (2006.01)
(52) U.S. Cl.
 CPC .. *G06F 12/0238* (2013.01); *G06F 2212/7203* (2013.01)
(58) Field of Classification Search
 CPC ......... G06F 12/0238; G06F 2212/7203; G06F 16/9024; G06F 16/9027
 See application file for complete search history.

(56) References Cited

U.S. PATENT DOCUMENTS

| | | | |
|---|---|---|---|
| 9,626,334 B2 | 4/2017 | Kaul et al. | |
| 10,949,087 B2 * | 3/2021 | Schwaderer | .......... G06F 3/0643 |
| 10,949,214 B2 | 3/2021 | Khan et al. | |
| 10,956,346 B1 | 3/2021 | Ben-Yehuda et al. | |
| 11,029,871 B2 | 6/2021 | Krasner et al. | |
| 2018/0255197 A1 * | 9/2018 | Oka | ..................... H04N 1/2104 |
| 2018/0341642 A1 | 11/2018 | Akerib | |
| 2019/0227739 A1 | 7/2019 | Khan et al. | |
| 2019/0251121 A1 | 8/2019 | Huang et al. | |

\* cited by examiner

*Primary Examiner* — Shawn X Gu
(74) *Attorney, Agent, or Firm* — Muir Patent Law, PLLC

(57) ABSTRACT

A storage device includes a controller configured to receive a pre-processing instruction command from an external device, a non-volatile memory configured to store an original graph data, and a buffer memory connected to the controller and the non-volatile memory, wherein the controller is configured to load the original graph data from the non-volatile memory, generate pre-processing graph data by classifying the original graph data depending on vector similarity in response to the pre-processing instruction command, generate metadata on the basis of the pre-processing graph data, and provide the pre-processing graph data and the metadata to the non-volatile memory, the non-volatile memory is configured to store the pre-processing graph data and the metadata in a data block, and the buffer memory is configured to buffer the original graph data, the pre-processing graph data, and the metadata.

20 Claims, 18 Drawing Sheets

FIG. 12

| MTD | [ Nearest Neighbor Block List ]<br>Blk2 – Blk12 – Blk43 – BLK9 ------<br>Blk2001 – Blk122 – Blk435 – BLK4359 ------<br>[ Block Preview Vector Data ]<br>Blk2 Size, min/max/avg. distance. .........<br>Blk2001 Preview Vector Data ...... |
|---|---|

STORAGE DEVICE FOR GRAPH DATA

CROSS-REFERENCE TO RELATED APPLICATION

This application claims priority from Korean Patent Application No. 10-2021-0143213 filed on Oct. 26, 2021, in the Korean Intellectual Property Office, and all the benefits accruing therefrom under 35 U.S.C. 119, the contents of which in its entirety are herein incorporated by reference.

BACKGROUND

1. Field

Embodiments relate to a storage device.

2. Description of the Related Art

Semiconductor memory devices include volatile memory devices and non-volatile memory devices. The volatile memory devices have fast read and write speeds, and meanwhile, the volatile memory devices may lose their stored contents when powered off. In contrast, since the non-volatile memory devices retain their stored contents even when powered off, the non-volatile memory devices are used to store contents that need to be retained, irrespective of supply of power.

For example, the volatile memory devices include a static RAM (SRAM), a dynamic RAM (DRAM), a synchronous DRAM (SDRAM), and the like. The non-volatile memory devices retain their stored contents even when powered off. For example, the non-volatile memory devices may be classified into a ROM (read only memory), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. The flash memory may be classified into a NOR type flash memory and a NAND type flash memory.

SUMMARY

Embodiments are directed to a storage device, including a controller configured to receive a pre-processing instruction command from an external device, a non-volatile memory configured to store an original graph data, and a buffer memory connected to the controller and the non-volatile memory, wherein the controller is configured to load the original graph data from the non-volatile memory, generate pre-processing graph data by classifying the original graph data depending on vector similarity in response to the pre-processing instruction command, generate metadata on the basis of the pre-processing graph data, and provide the pre-processing graph data and the metadata to the non-volatile memory, the non-volatile memory is configured to store the pre-processing graph data and the metadata in a data block, and the buffer memory is configured to buffer the original graph data, the pre-processing graph data, and the metadata.

Embodiments are directed to a storage device, including a non-volatile memory configured to include a plurality of data blocks and store an original graph data, a buffer memory configured to buffer the original graph data, and an FPGA configured to load the original graph data from the buffer memory, determine a block size of a first data block among the plurality of data blocks of the non-volatile memory on the basis of at least one of a data capacity of the buffer memory and a transfer rate of the original graph data, and store a first graph data among the original graph data in the first data block.

Embodiments are directed to a storage device, including a controller configured to receive a pre-processing instruction command and a query from an external device, and a non-volatile memory configured to store an original graph data, wherein the controller is configured to generate a pre-processing graph data and store the pre-processing graph data in the non-volatile memory on the basis of the original graph data in response to the pre-processing instruction command, load the pre-processing graph data in response to the query, and output a response signal on the basis of the pre-processing graph data.

BRIEF DESCRIPTION OF DRAWINGS

Features will become apparent to those of skill in the art by describing in detail example embodiments with reference to the attached drawings in which:

FIG. 12 is a diagram for explaining the metadata according to some example embodiments.

DETAILED DESCRIPTION OF THE EMBODIMENTS

Figure 1:
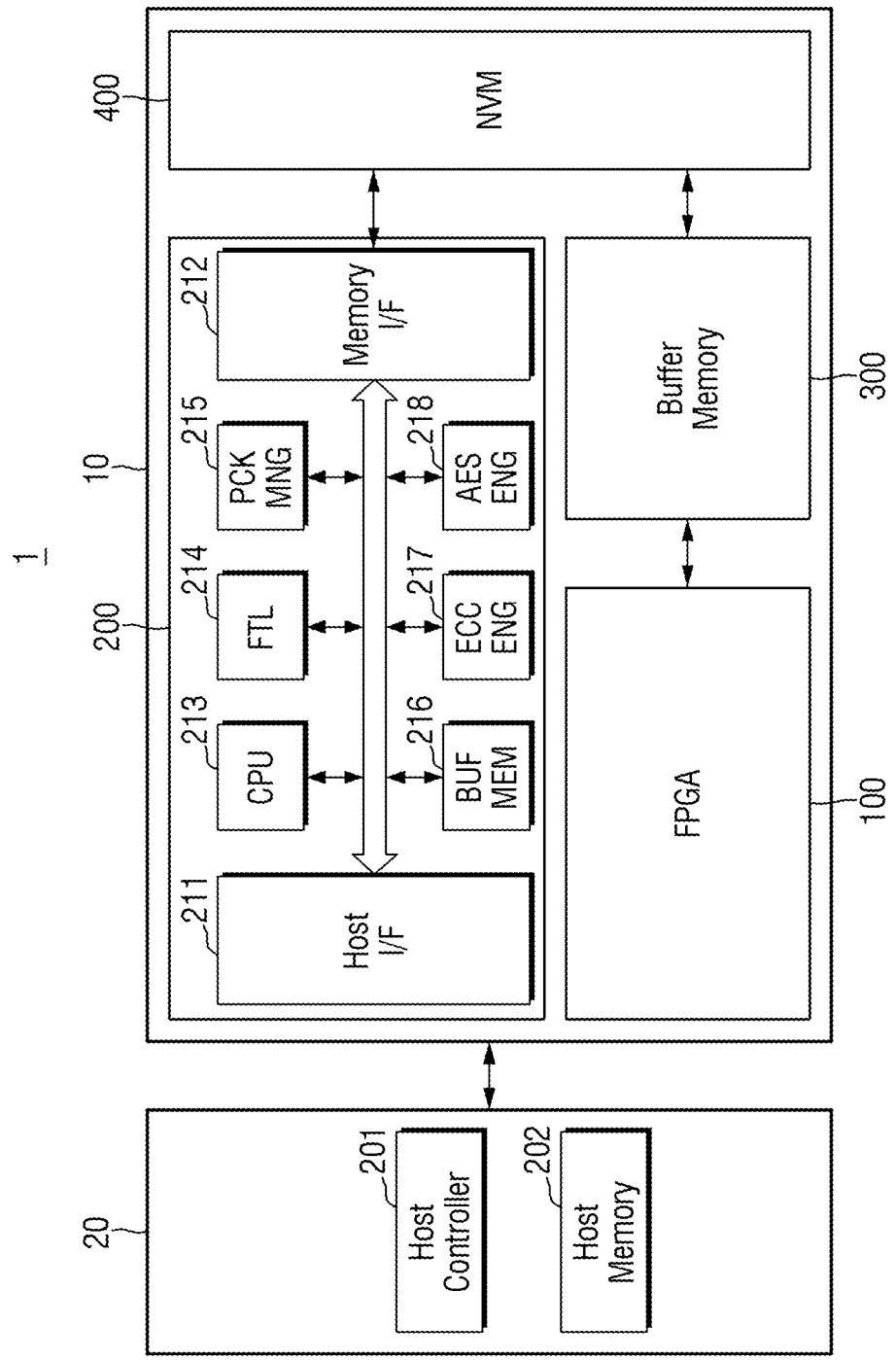
FIG. 1 is a block diagram of the memory system according to some example embodiments.

FIG. 1 is a block diagram of the memory system according to some example embodiments.

Referring to FIG. 1, a memory system 1 may include a host device 20 and a storage device 10. The host device 20 may include a host controller 201 and a host memory 202. The host controller 201 may control the overall operation of the host device 20. The host memory 202 may temporarily store data transmitted from the outside, data to be transmitted to the storage device 10, or data transmitted from the storage device 10. The host device 20 may be implemented as an application processor (AP).

The storage device 10 may include a field programmable gate array (FPGA) 100, a storage controller 200, a first buffer memory 300, and a non-volatile memory 400.

The storage device 10 may include a storage medium for storing the data in response to a request from the host device 20. As an example, the storage device 10 may include at least one of an SSD (Solid State Drive), an embedded memory, and a detachable external memory. When the storage device 10 is an SSD, the storage device 10 may be a device that complies with an NVMe (non-volatile memory express) standard. When the storage device 10 is an embedded memory or an external memory, the storage device 10 may be a device that complies with UFS (universal flash storage) or eMMC (embedded multi-media card) standard. The storage device 10 and the host device 20 may each generate and transmit packets according to the adopted standard protocol.

When a non-volatile memory 400 of the storage device 10 includes a flash memory, the flash memory may include a 2D NAND memory array or a 3D (or vertical) NAND (VNAND) memory array. As another example, the storage device 10 may also include various other types of non-volatile memories. For example, a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM) and various other types of memory may be applied as the storage device 10.

The FPGA 100 may perform various types of computations, calculations, and the like on the data stored in the first buffer memory 300. The FPGA 100 may perform the computation using a data set temporarily stored in the first buffer memory 300, using an algorithm mapped to a hardware logic configuration. The FPGA 100 may perform the computation using the data set stored in the non-volatile memory 400, without intervention of the host device 20. That is, the storage device 10 including the FPGA 100 according to the present example embodiment provides the data set to the host device 20, the host device 20 does not perform the computation process of the data set to process the computation using the data set stored in the non-volatile memory 400, and the storage device 10 completes the computation by itself through the FPGA 100 and may provide the computed result data to the host device 20. A more detailed description of the FPGA 100 will be provided below.

The storage controller 200 may include a host interface 211, a memory interface 212, and a CPU (central processing unit) 213. Further, the storage controller 200 may include a flash translation layer (FTL) 214, a packet manager 215, a second buffer memory 216, an ECC (error correction code) engine 217, and an AES (advanced encryption standard) engine 218. The storage controller 200 may further include a working memory (not shown) into which the flash translation layer (FTL) 214 is loaded, and the CPU 213 may execute the flash translation layer to perform data write and read operations on the non-volatile memory 400.

The host interface 211 may transmit and receive packets to and from the host device 20. Packets transmitted from the host device 20 to the host interface 211 may include a command or data to be written in the non-volatile memory 400, and packets transmitted from the host interface 211 to the host device 20 may include a response to the command, data that is read from the non-volatile memory 400, and the like. The memory interface 212 may transmit the data to be written in the non-volatile memory 400 to the non-volatile memory 400 or receive the data that is read from the non-volatile memory 400. The memory interface 212 may be implemented to comply with standard protocols such as Toggle or ONFI (Open NAD Flash Interface).

The flash translation layer 214 may perform several functions such as address mapping, wear-leveling, and garbage collection. The address mapping operation is an operation of changing a logical address received from the host device 20 into a physical address which is used for actually storing the data in the non-volatile memory 400. The wear-leveling is a technique for causing the blocks in the non-volatile memory 400 to be used uniformly to prevent an excessive degradation of a particular block, and may be implemented, for example, through a firmware technique for balancing the erasure counts of the physical blocks. The garbage collection is a technique for ensuring an available capacity in the non-volatile memory 400 through a method of copying valid data of the block to a new block and then erasing the existing block.

The packet manager 215 may generate a packet according to the protocol of the interface discussed with the host device 20, or may parse various types of information from the packet received from the host device 20.

The second buffer memory 216 may temporarily store the data to be written in the non-volatile memory 400 or the data to be read from the non-volatile memory 400. The second buffer memory 216 may be configured to be provided inside the storage controller 200, but may be placed outside the storage controller 200.

The ECC engine 217 may perform error detection and correction functions of the read data that is read from the non-volatile memory 400. More specifically, the ECC engine 217 may generate parity bits on the data to be written on the non-volatile memory 400, and the parity bits thus generated may be stored in the non-volatile memory 400 together with the write data. When reading the data from the non-volatile memory 400, the ECC engine 217 may correct an error of the read data using the parity bits that are read from the non-volatile memory 400 together with the read data, and may output the read data with a corrected error.

The AES engine 218 may perform at least one of an encryption operation and a decryption operation of the data which is input to the storage controller 200 using a symmetric-key algorithm.

The first buffer memory 300 may buffer the data stored in the non-volatile memory 400. Further, the first buffer memory 300 may buffer the data transferred from the FPGA 100. That is, when the FPGA 100 uses the data set stored in the non-volatile memory 400, the first buffer memory 300 may temporarily store the data set stored in the non-volatile memory 400 so that the FPGA 100 may use the data set. The non-volatile memory 400 may store the data set that is used when the FPGA 100 performs the computation.

Figure 2:
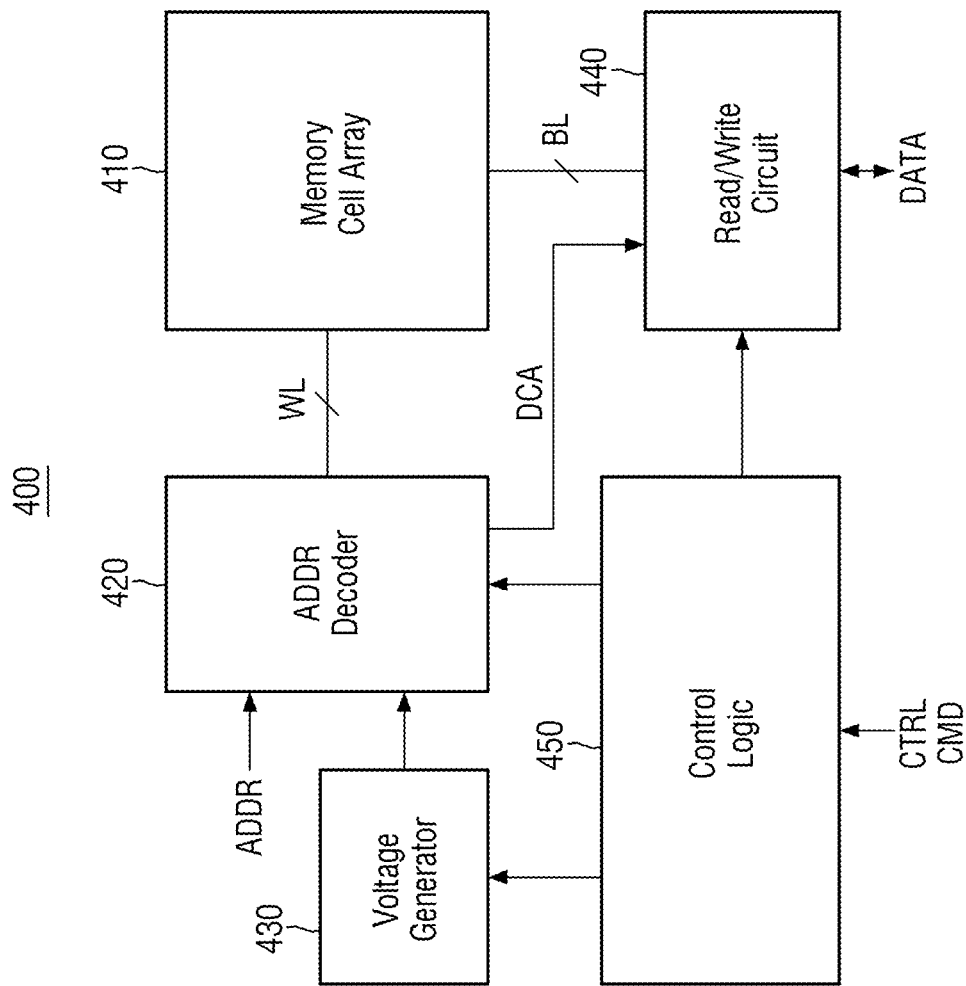
FIG. 2 is a block diagram of the non-volatile memory of FIG. 1.

FIG. 2 is a block diagram of the non-volatile memory of FIG. 1.

Referring to FIG. 2, the non-volatile memory 400 may include a memory cell array 410, an address decoder 420, a voltage generator 430, a read/write circuit 440, and a control logic circuit 450.

The memory cell array 410 may be connected to the address decoder 420 through word lines WL. The memory cell array 410 may be connected to the read/write circuit 440 through bit lines BL. The memory cell array 410 may include a plurality of memory cells. For example, memory cells arranged in a row direction may be connected to the word lines WL. For example, memory cells arranged in a column direction may be connected to the bit lines BL.

The address decoder 420 may be connected to the memory cell array 410 through the word lines WL. The address decoder 420 may operate in response to the control of the control logic circuit 450. The address decoder 420 may be provided with an address ADDR from the storage controller 200. The address decoder 420 may be supplied with a voltage used for operation such as a program or a read from the voltage generator 430.

The address decoder 420 may decode the row address of the received address ADDR. The address decoder 420 may select a word line WL using the decoded row address. The decoded column address DCA may be provided to the read/write circuit 440. For example, the address decoder 420 may include a row decoder, a column decoder, an address buffer, and the like.

The voltage generator 430 may generate the voltage used for the access operation according to the control of the control logic circuit 450. For example, the voltage generator 430 may generate a program voltage and a program verification voltage used to perform the program operation. For example, the voltage generator 430 may generate the read voltages used to perform the read operation, and may generate an erase voltage, an erase verification voltage, and the like used to perform the erase operation. Further, the voltage generator 430 may provide the address decoder 420 with the voltage used to perform each operation.

The read/write circuit 440 may be connected to the memory cell array 410 through the bit line BL. The read/write circuit 440 may exchange data DATA with the storage controller 200. The read/write circuit 440 may operate in response to the control of the control logic circuit 450. The read/write circuit 440 may be provided with a column address DCA decoded from the address decoder 420. The read/write circuit 440 may select a bit line BL using the decoded column address DCA.

For example, the read/write circuit 440 may program the received data DATA into the memory cell array 410. The read/write circuit 440 may read data from the memory cell array 410, and provide the read data to the outside (for example, the storage controller 200). For example, the read/write circuit 440 may include a configuration such as a sense amplifier, a write driver, a column selection circuit, and a page buffer. That is, the read/write circuit 440 may buffer the data DATA, which is received from the storage controller 200, to the page buffer, and program the buffered data DATA in the memory cell array 410.

The control logic circuit 450 may be connected to the address decoder 420, the voltage generator 430, and the read/write circuit 440. The control logic circuit 450 may control the operation of the non-volatile memory 400. The control logic circuit 450 may operate in response to a control signal CTRL and the command CMD (e.g., a write command, a read command, etc.) provided from the storage controller 200.

Figure 3:
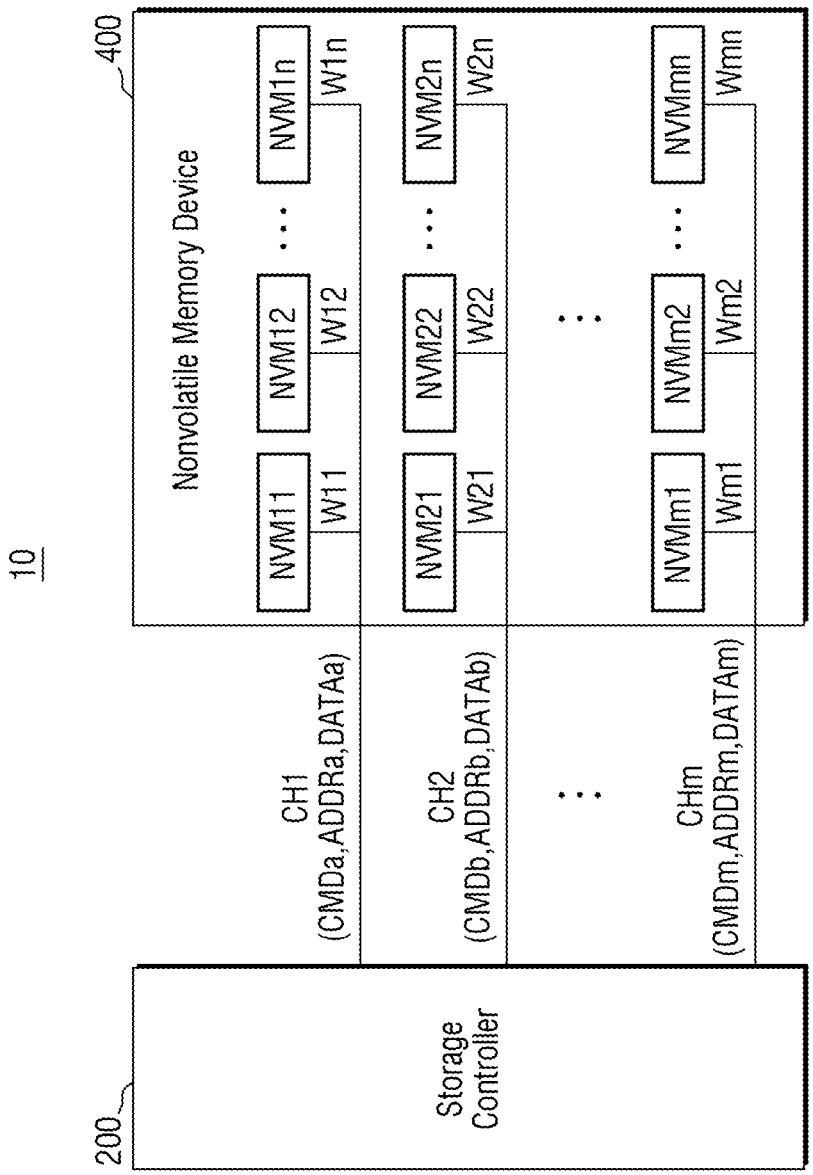
FIG. 3 is a block diagram of the storage controller and the non-volatile memory of FIG. 1.

FIG. 3 is a block diagram of the storage controller and the non-volatile memory of FIG. 1.

Referring to FIG. 3, the storage device 10 may include the storage controller 200 and the non-volatile memory 400. The storage device 10 may support a plurality of channels CH1 to CHm, and the storage controller 200 and the non-volatile memory 400 may be connected through the plurality of channels CH1 to CHm. For example, the storage device 10 may be implemented as a storage device such as an SSD (Solid State Drive).

The non-volatile memory 400 may include a plurality of non-volatile memory devices NVM11 to NVMmn. Each of the non-volatile memory devices NVM11 to NVMmn may be connected to one of a plurality of channels CH1 to CHm through corresponding way. For example, the non-volatile memory devices NVM11 to NVM1$n$ may be connected to a first channel CH1 through ways W11 to W1$n$, and the non-volatile memory devices NVM21 to NVM2$n$ may be connected to a second channel CH2 through ways W21 to W2$n$. In an example embodiment, each of the non-volatile memory devices NVM11 to NVMmn may be implemented in any memory unit that may operate in accordance with individual instructions from the storage controller 200. For example, each of the non-volatile memory devices NVM11 to NVMmn may be implemented as a chip or a die.

The storage controller 200 may transmit and receive signals to and from the non-volatile memory 400 through the plurality of channels CH1 to CHm. For example, the storage controller 200 may transmit commands CMDa to CMDm, addresses ADDRa to ADDRm, and data DATAa to DATAm to the non-volatile memory 400 through the channels CH1 to CHm, or may receive the data DATAa to DATAm from the non-volatile memory 400.

The storage controller 200 may select one of the non-volatile memory devices connected to the channel through each channel, and may transmit and receive signals to and from the selected non-volatile memory device. For example, the storage controller 200 may select the non-volatile memory device NVM11 among the non-volatile memory devices NVM11 to NVM1$n$ connected to the first channel CH1. The storage controller 200 may transmit command CMDa, address ADDRa, and data DATAa to the selected non-volatile memory device NVM11 through the first channel CH1, or may receive the data DATAa from the selected non-volatile memory device NVM11.

The storage controller 200 may transmit and receive signals in parallel to and from the non-volatile memory 400 through channels different from each other. For example, the storage controller 200 may transmit a command CMDb to the non-volatile memory 400 through the second channel CH2, while transmitting the command CMDa to the non-volatile memory 400 through the first channel CH1. For example, the storage controller 200 may receive data DATAb from the non-volatile memory 400 through the second channel CH2, while receiving the data DATAa from the non-volatile memory 400 through the first channel CH1.

The storage controller 200 may control the overall operation of the non-volatile memory 400. The storage controller 200 may transmit the signal to the channels CH1 to CHm to control each of the non-volatile memory devices NVM11 to NVMmn connected to the channels CH1 to CHm. For example, the storage controller 200 may transmit the command CMDa and the address ADDRa to the first channel CH1 to control selected one among the non-volatile memory devices NVM11 to NVM1$n$.

Each of the non-volatile memory devices NVM11 to NVMmn may operate under the control of the storage controller 200. For example, the non-volatile memory device NVM11 may program the data DATAa in accordance with the command CMDa, the address ADDRa, and the data DATAa provided to the first channel CH1. For example, a non-volatile memory device NVM21 may read the data DATAb in accordance with the command CMDb and the address ADDRb provided to the second channel CH2, and may transmit the read data DATAb to the storage controller 200.

Although FIG. 3 shows that the non-volatile memory 400 communicates with the storage controller 200 through m channels, and the non-volatile memory 400 includes n non-volatile memory devices to correspond to each channel, the number of channels and the number of non-volatile memory devices connected to one channel may be variously changed.

Figure 4:
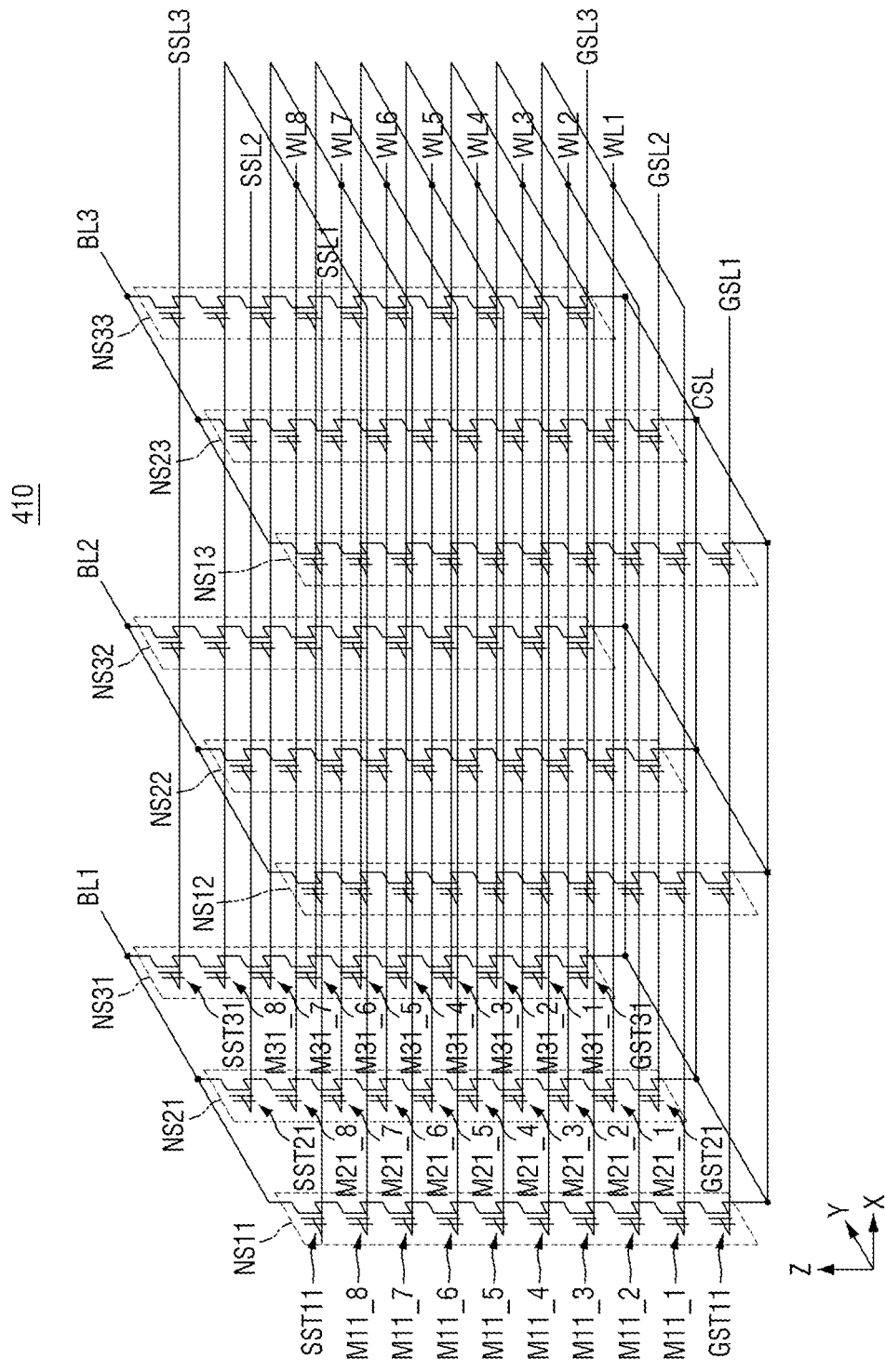
FIG. 4 is an example circuit diagram showing a memory cell array according to some example embodiments.

FIG. 4 is an example circuit diagram showing a memory cell array according to some example embodiments.

Referring to FIG. 4, plurality of cell strings NS11, NS21, NS31, NS12, NS22, NS32, NS13, NS23, and NS33 may be arranged on a substrate (not shown) in a first direction x and a second direction y. The plurality of cell strings NS11, NS21, NS31, NS12, NS22, NS32, NS13, NS23, and NS33 may have a form that extends in a third direction z. The plurality of cell strings NS11, NS21, NS31, NS12, NS22, NS32, NS13, NS23, and NS33 may be connected in common to a common source line CSL formed on the substrate or inside the substrate. The common source line CSL is shown as being connected to lowermost ends of the plurality of cell strings NS11, NS21, NS31, NS12, NS22, NS32, NS13, NS23, and NS33 in the third direction z, but the common source line CSL may be electrically connected to the lowermost ends of the plurality of cell strings NS11, NS21, NS31, NS12, NS22, NS32, NS13, NS23, and NS33 in the third direction z, and the common source line CSL is not limited to a configuration physically located at the lower ends of the plurality of cell strings NS11, NS21, NS31, NS12, NS22, NS32, NS13, NS23, and NS33. Further, although FIG. 4 shows that the plurality of cell strings NS11, NS21, NS31, NS12, NS22, NS32, NS13, NS23, and NS33 are placed in a 3×3 arrangement, the placement form and the number of the plurality of cell strings placed in the memory cell array 410 may be varied.

Some cell strings NS11, NS12, and NS13 may be connected to a first ground select line GSL1. Some cell strings NS21, NS22, and NS23 may be connected to a second ground select line GSL2. Some cell strings NS31, NS32, and NS33 may be connected to a third ground select line GSL3.

Further, some cell strings NS11, NS12, and NS13 may be connected to a first string select line SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor SST connected to each string select line. In addition, each of the plurality of cell strings NS11, NS21, NS31, NS12, NS22, NS32, NS13, NS23, and NS33 may include a ground select transistor GST connected to each ground select line.

One end of each ground select transistor of the plurality of cell strings NS11, NS21, NS31, NS12, NS22, NS32, NS13, NS23, and NS33 may be connected to the common source line CSL. Also, in each of the plurality of cell strings NS11, NS21, NS31, NS12, NS22, NS32, NS13, NS23, and NS33, a plurality of memory cells may be stacked sequentially in the third direction z, between the ground select transistor and the string select transistor. Although not shown in FIG. 4, each of the plurality of cell strings NS11, NS21, NS31, NS12, NS22, NS32, NS13, NS23, and NS33 may include dummy cells between the ground select transistor and the string select transistor. Further, the number of string select transistors included in each string may be varied.

A cell string NS11 may include a ground select transistor GST11 placed at the lowermost end in the third direction z, a plurality of memory cells M11_1 to M11_8 stacked sequentially in the third direction z on the ground select transistor GST11, and a string select transistor SST11 stacked in the third direction z on the uppermost memory cell M11_8. Further, a cell string NS21 may include a ground select transistor GST21 placed at the lowermost end in the third direction z, a plurality of memory cells M21_1 to M21_8 stacked sequentially in the third direction z on the ground select transistor GST21, and a string select transistor SST21 stacked in the third direction z on the uppermost memory cell M21_8. Further, a cell string NS31 may include a ground select transistor GST31 placed at the lowermost end in the third direction z, a plurality of memory cells M31_1 to M31_8 stacked sequentially in the third direction z on the ground select transistor GST31, and a string select transistor SST31 stacked in the third direction z on the uppermost memory cell M31_8.

The memory cells located at the same height in the third direction z from the substrate or the ground select transistor may be electrically connected in common through respective word lines. For example, the memory cells of a height at which memory cells M11_1, M21_1, and M31_1 are formed may be connected to a first word line WL1. Further, the memory cells of a height at which the memory cells M11_2, M21_2, and M31_2 are formed may be connected to a second word line WL2. Hereinafter, since the placement and structure of the memory cells connected to the third word line WL3 to the eighth word line WL8 are also similar to this, the description thereof will not be provided.

One end of each string select transistor of the plurality of cell strings NS11, NS21, NS31, NS12, NS22, NS32, NS13, NS23, and NS33 may be connected to the bit lines BL1, BL2, and BL3. For example, the string select transistors ST11, SST21, and SST31 may be connected to the bit line BL1 that extends in the second direction y. Since explanation of other string select transistors connected to the bit lines BL2 and BL3 are also similar to this, explanation thereof will not be provided.

The memory cells corresponding to one string (or ground) select line and one word line may form one page. The write operation and the read operation may be performed in units of each page. Each memory cell on each page may also store two or more bits. The bits written to the memory cells of each page may form logical pages.

The memory cell array 410 may be provided as a three-dimensional memory array. The three-dimensional memory array may be formed monolithically at one or more physical levels of the arrays of the memory cells having an active region placed on a substrate (not shown) and circuits related to the operation of the memory cells. The circuits related to the operation of the memory cells may be located inside or above the substrate. The monolithic formation means that layers of each level of the 3D array may be deposited directly on the layers of the lower level of the 3D array.

Figure 5:
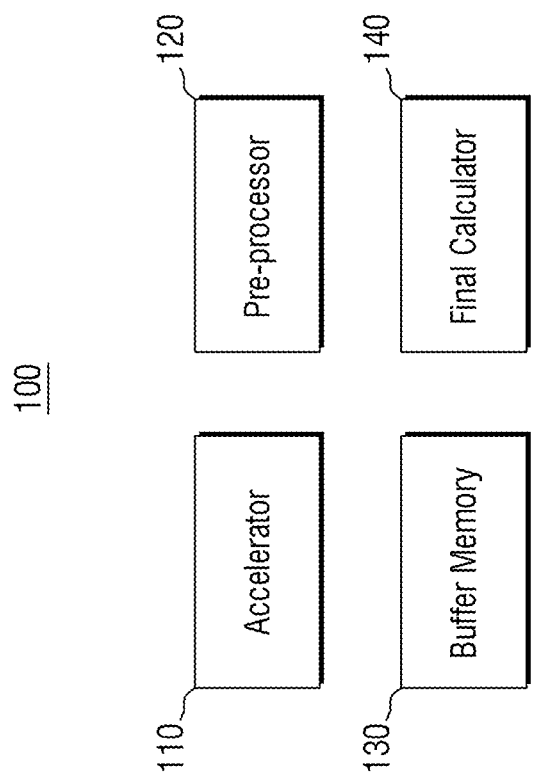
FIG. 5 is a block diagram of a FPGA according to some example embodiments.

FIG. 5 is a block diagram of the FPGA according to some example embodiments.

Referring to FIG. 5, the FPGA 100 may include an accelerator 110, a pre-processor 120, a third buffer memory 130, and a final calculator 140.

The accelerator 110 may perform calculations by itself. For example, the accelerator 110 may perform a calculation that may be otherwise be performed by the host device 20, on behalf of the host device 20. The accelerator 110 may perform the calculation on the basis of the data set stored in the non-volatile memory 400. The accelerator 110 may perform the calculation in response to a command from the host device 20, and provide the calculation execution result to the host device 20.

The accelerator 110 may perform the calculation using a hierarchical navigable small world (HNSW) search algorithm in a nearest neighbor search algorithm. In the present specification, although the accelerator 110 is described as performing the calculation using the HNSW algorithm, this is merely an example for explanation. For example, the accelerator 110 may perform the calculation using an approximate nearest neighbor search algorithm. In another example, the accelerator 110 may perform the calculation using a fixed-radius near neighbor search algorithm.

The accelerator 110 may receive the data set and query used for the calculation. For example, the accelerator 110 may receive the data set used for the calculation from the non-volatile memory 400 or the first buffer memory 300. Further, the accelerator 110 may receive a query used for the calculation from the host device 20. The accelerator 110 may output the result of performing the calculation on the data set in response to the query. Further, the accelerator 110 may provide the result of performing the calculation to the host device 20 or the non-volatile memory 400.

The pre-processor 120 may perform pre-processing on the data set that is provided from the first buffer memory 300. For example, the pre-processor 120 may receive the data set stored in the non-volatile memory 400 through the first buffer memory 300. The pre-processor 120 may check vector data included in the data set. Here, the vector data may include a plurality of dimensional information. The pre-processor 120 may determine similarity between the plurality of vector data. For example, the pre-processor 120 may determine the similarity between the vector data using the HNSW algorithm. The pre-processor 120 may generate a pre-processing data set including the similar vector data. That is, the pre-processing data set may correspond to a data set having vector data with existing vector similarity. A detailed explanation thereof will be provided below.

The third buffer memory 130 may buffer the data set from the non-volatile memory 400. For example, the third buffer memory 130 may re-buffer the data set buffered in the first buffer memory 300. In an implementation, the third buffer memory 130 may be omitted from the FPGA 100, and the data set buffered in the first buffer memory 300 may be directly transferred to the accelerator 110 or the pre-processor 120.

The final calculator 140 may calculate the final result data using the final candidate data generated from the accelerator 110. In some example embodiments, the final calculator 140 may perform a brute-force calculation. In some example embodiments, the final calculator 140 may be placed on a chip different from the FPGA 100. In some other embodiments, the final calculator 140 may be included in the host device 20. In this case, the final candidate data is provided from the accelerator 110, and the final calculator 140 included in the host device 20 may calculate the final result data.

Hereinafter, the operation of the pre-processor 120 will be described referring to FIGS. 6 to 12.

Figure 6:
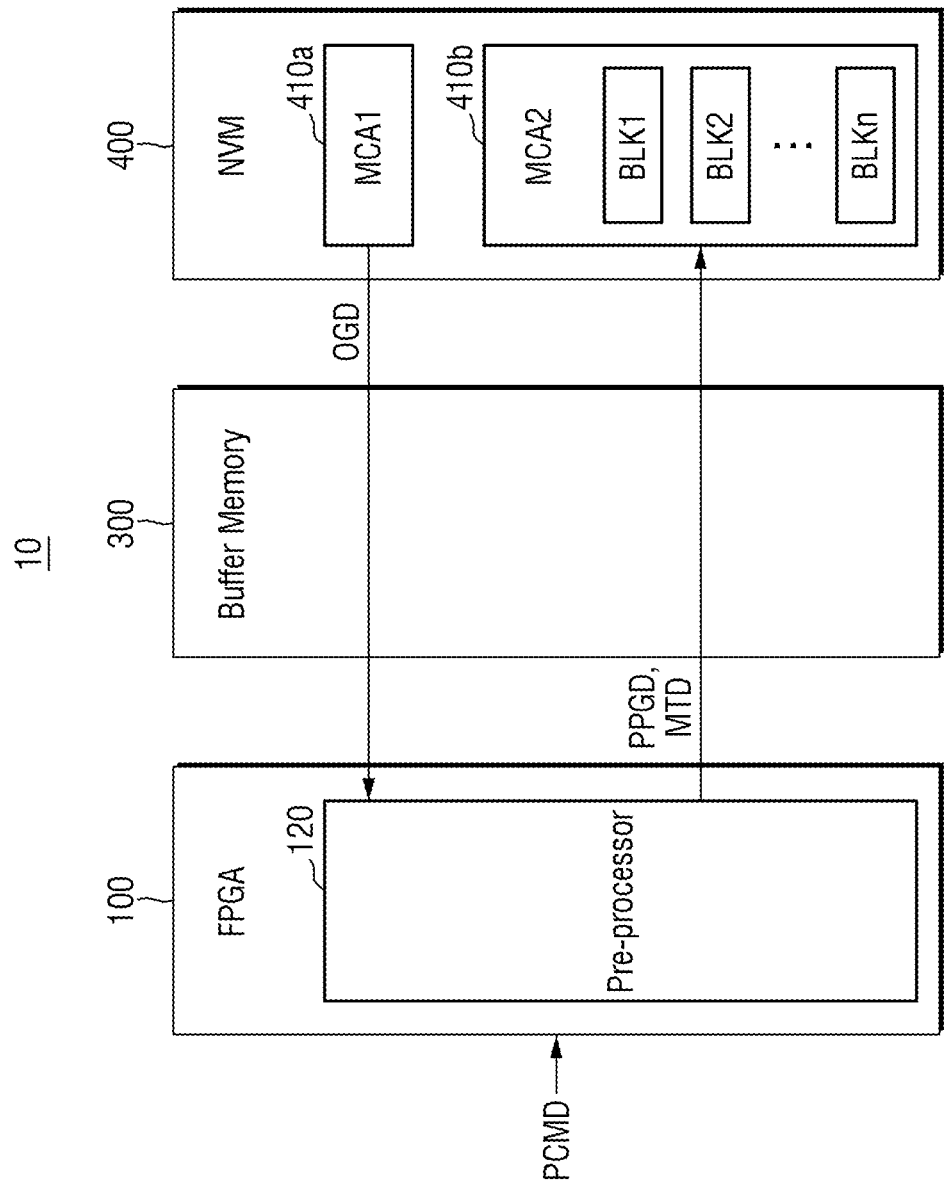
FIG. 6 is a block diagram of a memory system which performs the pre-processing on an original graph data according to some example embodiments.
Figure 7:
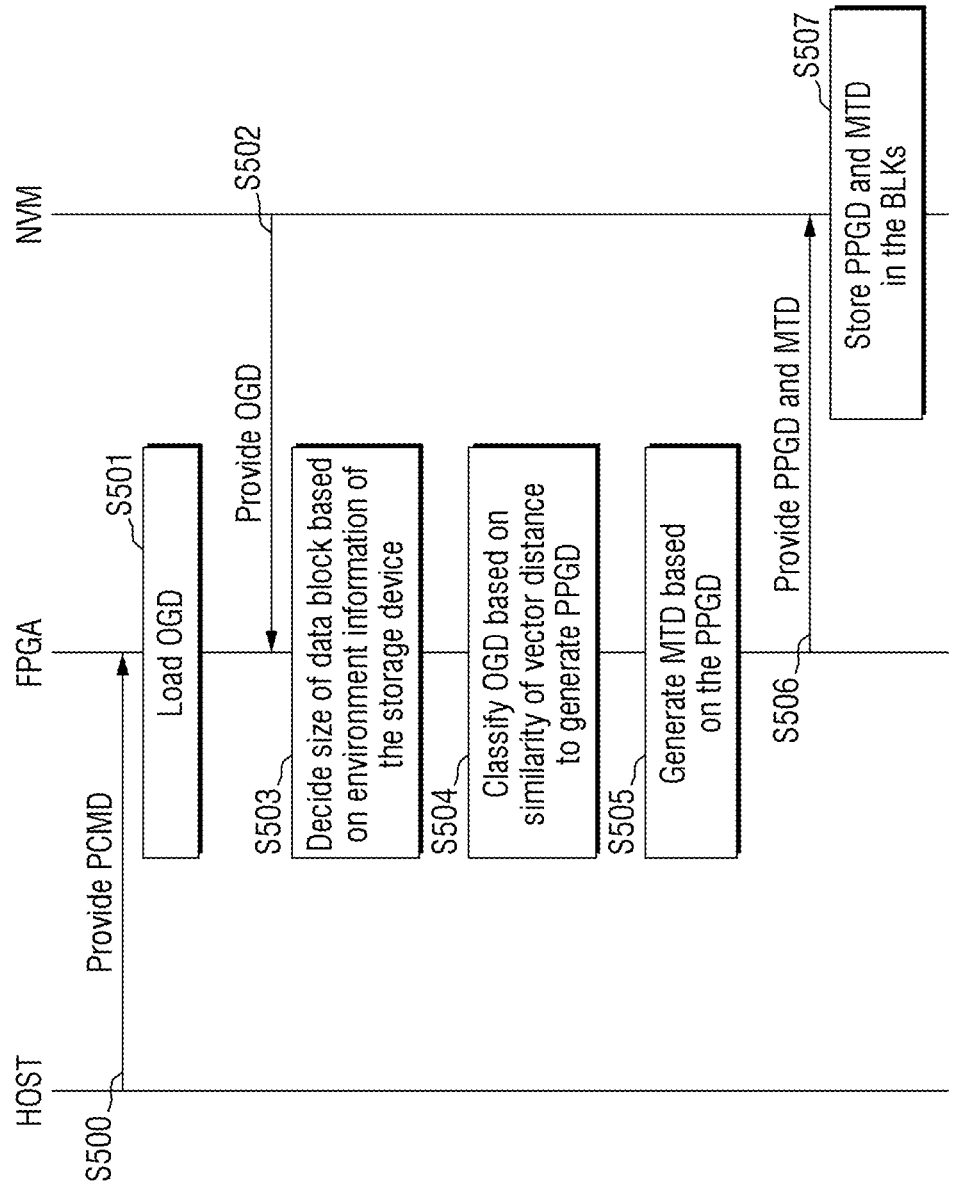
FIG. 7 is a ladder diagram for explaining the operation of the memory system of FIG. 6.

FIG. 6 is a block diagram of a memory system which performs the pre-processing on an original graph data according to some example embodiments. FIG. 7 is a ladder diagram for explaining the operation of the memory system of FIG. 6.

Referring to FIGS. 6 and 7, the host device 20 may provide a pre-processing instruction command PCMD to the FPGA 100 (S500). Here, the pre-processing instruction command PCMD corresponds to a command of instructing the pre-processor 120 to perform the pre-processing operation. That is, the pre-processor 120 may perform the pre-processing on the data set in response to the pre-processing instruction command PCMD. However, the pre-processor 120 may perform the pre-processing operation, even when the pre-processing instruction command PCMD is not transferred.

The FPGA 100 may load original graph data OGD (S501). That is, the FPGA 100 may load the original graph data OGD in response to the pre-processing instruction command PCMD. Therefore, the non-volatile memory 400 may provide the original graph data OGD to the FPGA 100 (S502). That is, the original graph data OGD stored in the first memory cell array 410*a* may be provided to the pre-processor 120 through the first buffer memory 300.

Here, the original graph data OGD may include a plurality of image vector data. In some example embodiments, one image vector data may include 128-dimensional data. Since one-dimensional data may correspond to 4B, one image vector data may correspond to 512B. Further, the image vector data may include a list of nearest vector data. Therefore, the image vector data may be connected according to the proximity, which may be represented as the original graph data OGD.

The pre-processor 120 may receive the pre-processing instruction command PCMD and the original graph data OGD. The pre-processor 120 may perform the pre-processing on the original graph data OGD in response to the pre-processing instruction command PCMD.

First, the pre-processor 120 may determine the block size of the data blocks BLK1 to BLKn on the basis of the environment information of the storage device 10 (S503). That is, the pre-processor 120 may determine the block size of the data stored in the data blocks BLK1 to BLKn included in the second memory cell array 410*b* of the non-volatile memory 400.

Figure 8:
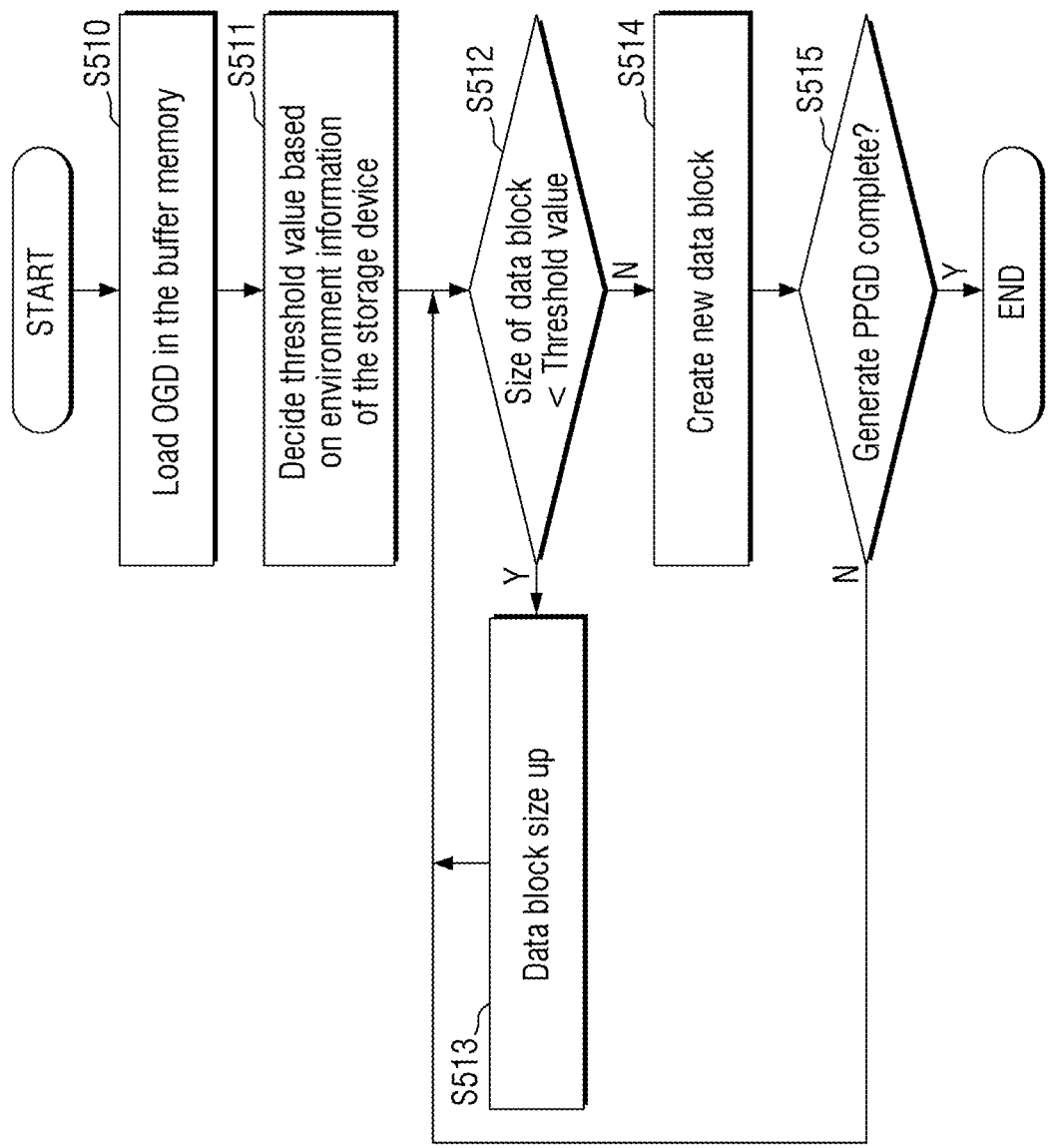
FIG. 8 is a flow chart for explaining the operation of the FPGA of FIG. 6.
Figure 9:
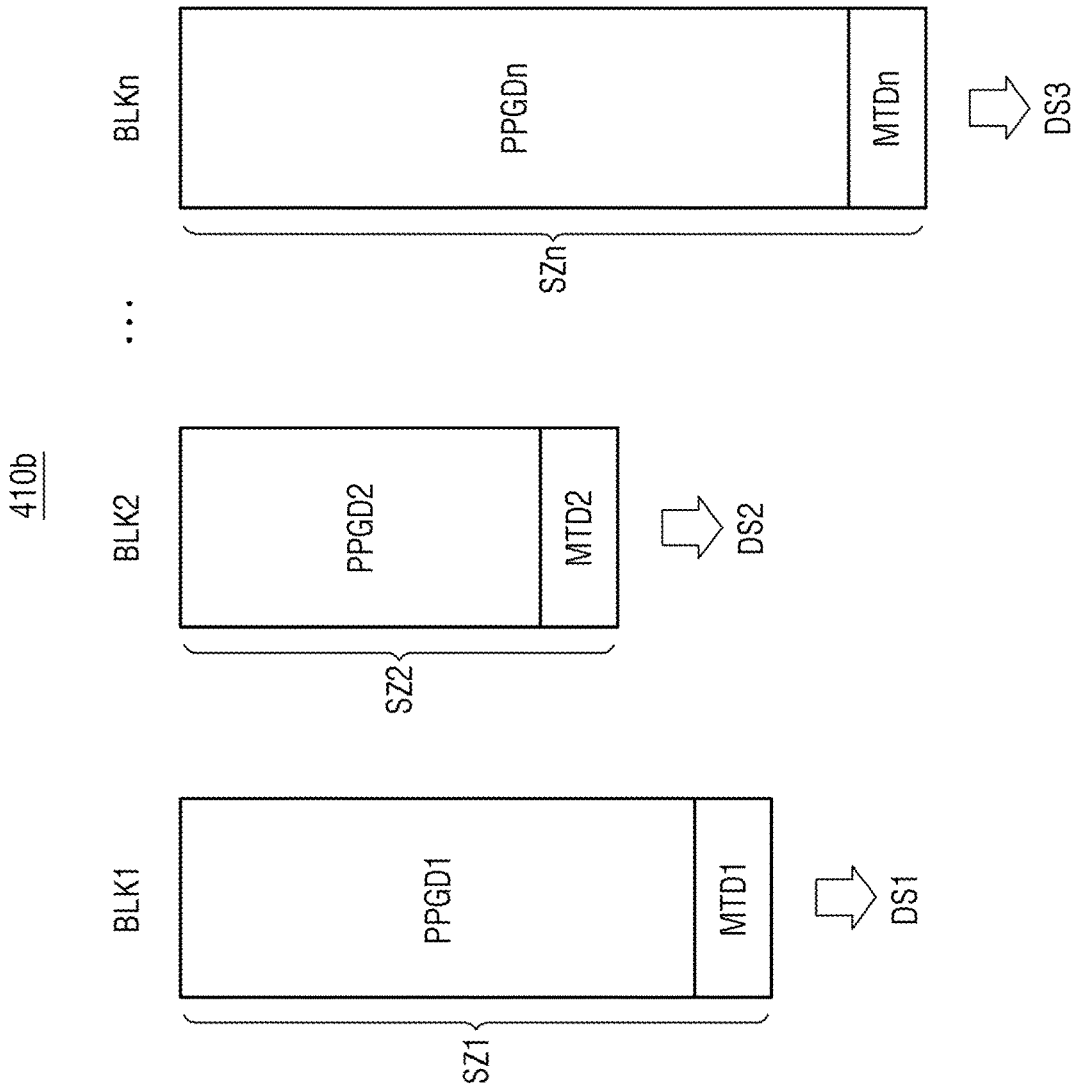
FIG. 9 is a diagram for explaining a plurality of data sets stored in the second memory cell array.

FIG. 8 is a flow chart for explaining the operation of the FPGA of FIG. 6. FIG. 9 is a diagram for explaining a plurality of data sets stored in the second memory cell array.

Referring to FIGS. 8 and 9, the FPGA 100 may load the original graph data OGD into the first buffer memory 300 (S510). The pre-processor 120 may determine a threshold value on the basis of the environment information of the storage device 10 (S511). For example, the second memory cell array 410*b* may include the first to nth data blocks BLK1 to BLKn. A block size of a first data block BLK1 may correspond to a first block size SZ1, a block size of a second data block BLK2 may correspond to a second block size SZ2, and a block size of a nth data block BLKn may corresponds to a nth block size SZn. That is, the pre-processor 120 may determine the first to nth block size SZ1 to SZn.

Here, the pre-processor 120 may determine the threshold value of the block size on the basis of the internal environment information of the storage device 10. For example, the pre-processor 120 may determine threshold values of the block sizes of the data blocks included in the memory cell array 410*b* on the basis of information such as a data capacity of the first buffer memory 300 and a transfer rate of the data. For example, when the data capacity of the first buffer memory 300 is relatively large, the threshold value of the data block may be relatively large. Further, the threshold value of the data block may vary depending on the degree of concentration of the image vector data included in a generated pre-processing graph data PPGD.

The pre-processor 120 may determine whether the block size of the data block is smaller than the determined threshold value (S512). If the block size of the data block is smaller than the determined threshold value (S512-Y), the block size of the data block may increase (S513). That is, the block size of the data block generated in this case may continue to increase. If the block size of the data block is not smaller than the determined threshold value (S512-N), the pre-processor 120 may generate a new data block (S514). That is, the pre-processor 120 may store the pre-processing graph data PPGD in the newly generated data block.

If the generation of the pre-processing graph data PPGD is completed (S515-Y), the operation may be terminated, and if the generation of the pre-processing graph data PPGD is not completed (S515-N), the pre-processor 120 may perform the operation (S512) again.

Referring to FIGS. 6, 7, and 9 again, the pre-processor 120 may classify the original graph data OGD on the basis of the vector distance similarity to generate the pre-processing graph data PPGD (S504). The original graph data OGD may be a data set that is not classified and is randomly stored in the data blocks of the first memory cell array 410a. The pre-processing graph data PPGD may be stored in the data blocks BLK1 to BLKn of the second memory cell array 410b by being classified. Here, the image vector data stored in each of the data blocks BLK1 to BLKn may have vector similarity. That is, the first image vector data included in the first pre-processing graph data PPGD1 stored in the first data block BLK1 may have vector similarity to each other, the second image vector data included in second pre-processing graph data PPGD2 stored in the second data block BLK2 may have vector similarity to each other, and the nth image vector included in the nth pre-processing graph data PPGDn stored in the nth data block BLKn may have vector similarity to each other. However, the first to nth image vector data may not have vector similarity to each other.

Figure 10:
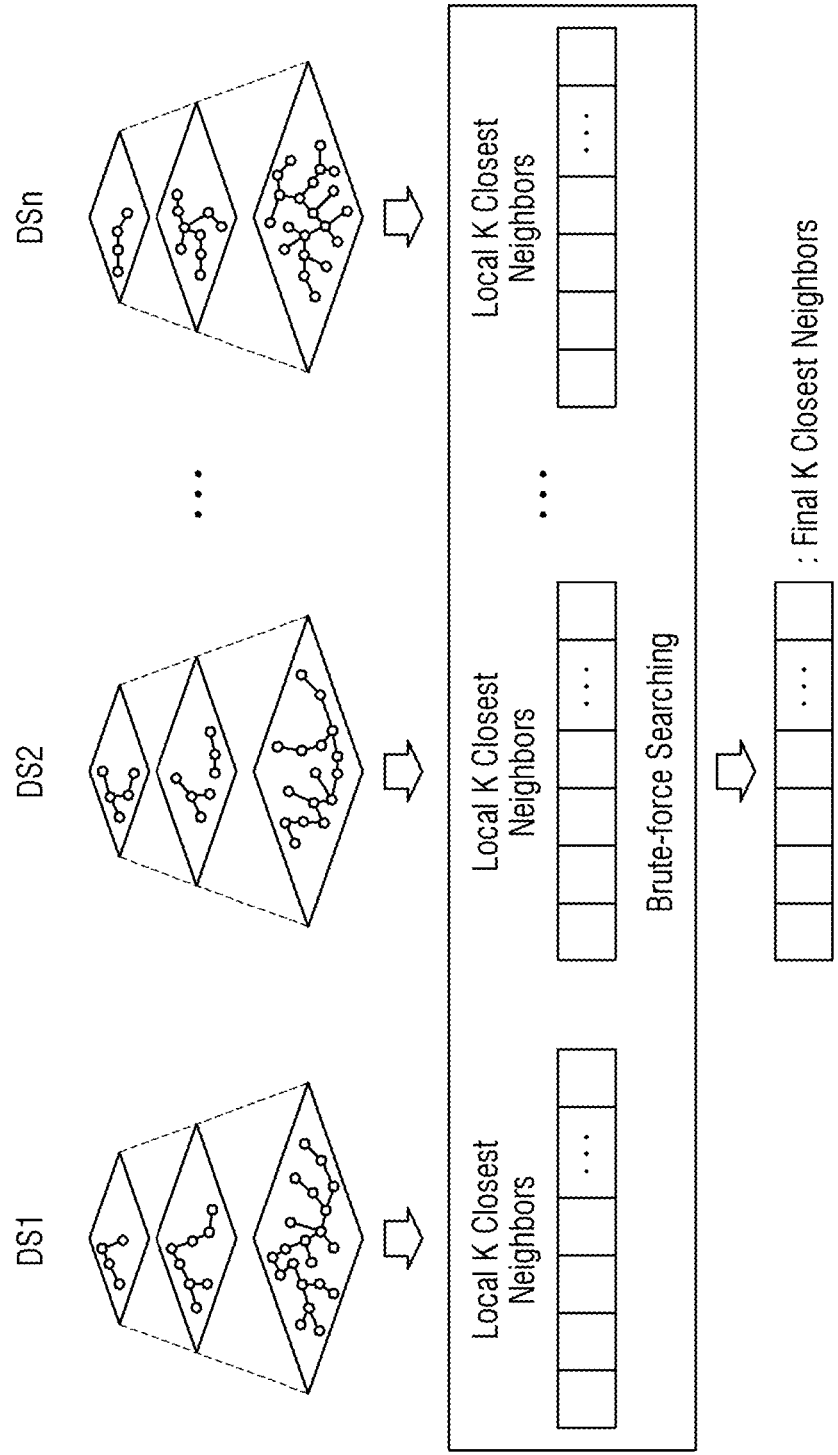
FIG. 10 is diagrams for explaining the operation of the FPGA including the accelerator according to some example embodiments.
Figure 11:
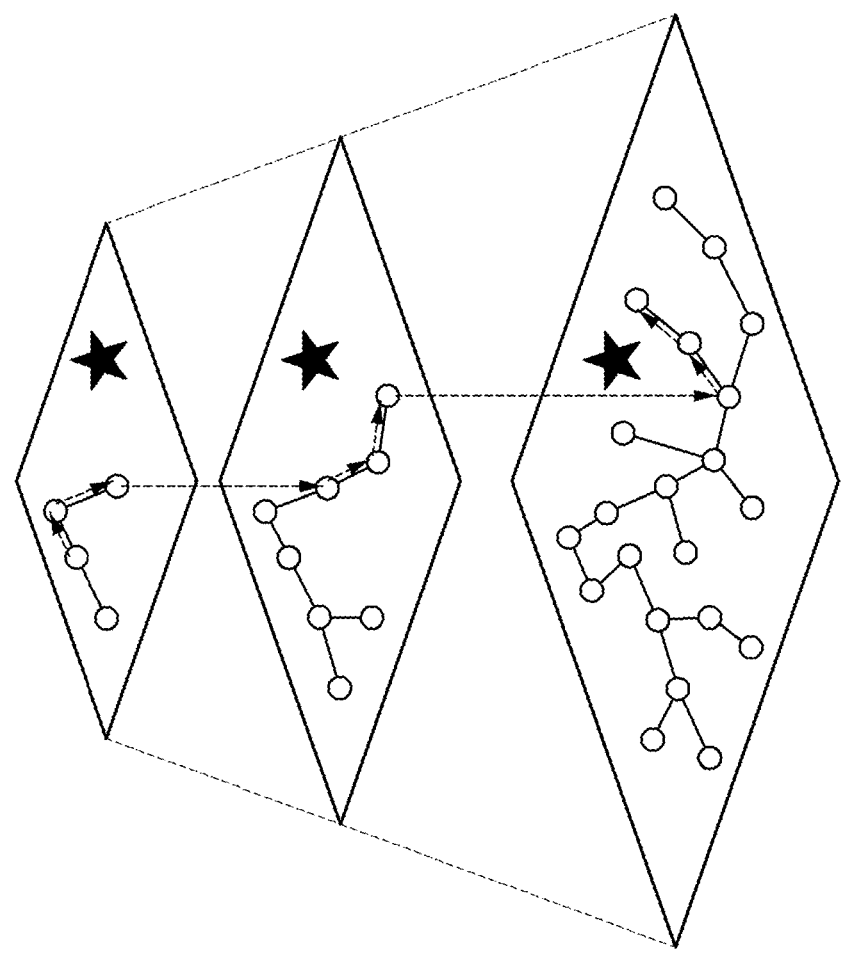
FIG. 11 is diagrams for explaining the operation of the FPGA including the accelerator according to some example embodiments.

FIGS. 10 and 11 are diagrams for explaining the operation of the FPGA including the accelerator according to some example embodiments.

Referring to FIGS. 10 and 11, the pre-processor 120 may process the data using the HNSW algorithm. However, the pre-processor 120 or the accelerator 110 may process data using various algorithms.

The pre-processor 120 may process a plurality of data sets DS1 to DSn. A plurality of data sets DS1 to DSn may correspond to a graph structure. The graph structure formed by the data included in the plurality of data sets DS1 to DSn may include a plurality of layers. The plurality of layers may include from a top layer to layer 0. Each of the plurality of layers may include a plurality of points. The plurality of points may include image vector information.

In a graph structure implemented as the data included in the data sets DS1 to DSn, the top layer may include the smallest number of points. As the layer goes down, the number of points included in the layer may increase. The layer 0, which is the lowest layer of the graph structure, may include all the points of the data sets DS1 to DSn. Each layer may include all the points included in the upper layer. Accordingly, the vertically adjacent layers may be connected through the points.

In some example embodiments, the pre-processor 120 may start a search for data corresponding to the pre-processing instruction command PCMD from the top layer.

After finding the point nearest to the data, the pre-processor 120 may start the lower layer search on the basis of that point.

In some example embodiments, the pre-processor 120 may obtain local K nearest neighbors from each of the data set DS1 to DSn using a plurality of data sets DS1 to DSn. The local K nearest neighbors may include final candidate data. Therefore, the final K nearest neighbors may be generated. The pre-processing graph data PPGD may be generated through the above-mentioned classification method of the data set included in the original graph data OGD. Here, the image vector data of the first pre-processing graph data PPGD1 has vector similarity, the image vector data of the second pre-processing graph data PPGD2 has vector similarity, and the image vector data of the nth pre-processing graph data PPGDn may have vector similarity. The pre-processing graph data PPGD may be stored in the data blocks BLK1 to BLKn in which the block size of the second memory cell array 410b of the non-volatile memory 400 is determined.

Referring to FIGS. 7 and 9 again, the pre-processor 120 may generate metadata MTD on the basis of the pre-processing graph data PPGD (S505). The pre-processor 120 may generate a first metadata MTD1 on the basis of the first pre-processing graph data PPGD1. The first metadata MTD1 may include information indicating a relationship between the image vector data included in the first pre-processing graph data PPGD1 and other pre-processing graph data.

FIG. 12 is a diagram for explaining the metadata according to some example embodiments.

Referring to FIG. 12, the metadata MTD may include a nearest neighbor block list. For example, the metadata MTD may include information that the second data block BLK2 is near to a twelfth data block BLK12, a forty-third data block BLK43, and a ninth data block BLK9.

Further, the metadata MTD may include block preview vector data. The block preview vector data may include a second block size SZ2 (which is a block size of the second data block BLK2), a minimum value, a maximum value, and an average value among the data of the second pre-processing graph data PPGD2 stored in the second data block BLK2, a vector similarity distance between the second data block BLK2 and another data block, and the like.

Referring to FIG. 9 again, the pre-processor 120 may generate a plurality of metadata MTD. The first to nth metadata MTD1 to MTDn may be generated. Here, the first data set DS1 may include the first pre-processing graph data PPGD1 and the first metadata MTD1, the second data set DS2 may include the second pre-processing graph data PPGD2 and the second metadata MTD2, and the nth data set DSn may include the nth pre-processing graph data PPGDn and the nth metadata MTDn.

Referring to FIG. 7 again, the pre-processor 120 may provide the pre-processing graph data PPGD and the metadata MTD to the non-volatile memory 400 (S506). As a result, the non-volatile memory 400 may store the pre-processing graph data PPGD and the metadata MTD in the plurality of data blocks BLK1 to BLKn (S507). As a result, the pre-processing graph data PPGD organized according to the vector similarity may be stored in the second memory cell array 410b of the non-volatile memory 400, and the original graph data OGD stored in the first memory cell array 410a may be deleted. Since the pre-processing graph data PPGD is stored in the plurality of data blocks BLK1 to BLKn, the performance of the storage device 10 may be improved.

Figure 13:
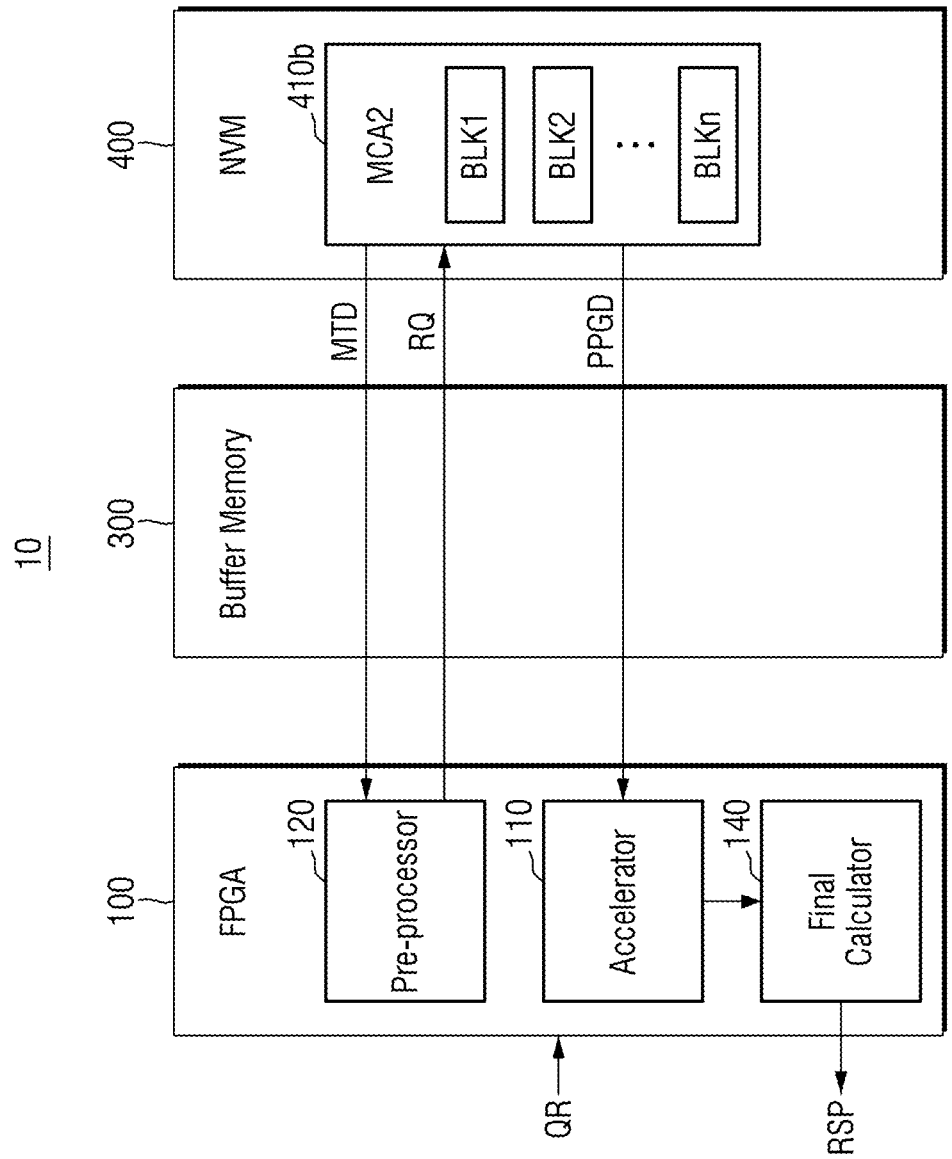
FIG. 13 is a block diagram of a memory system that responds to query according to some example embodiments.
Figure 14:
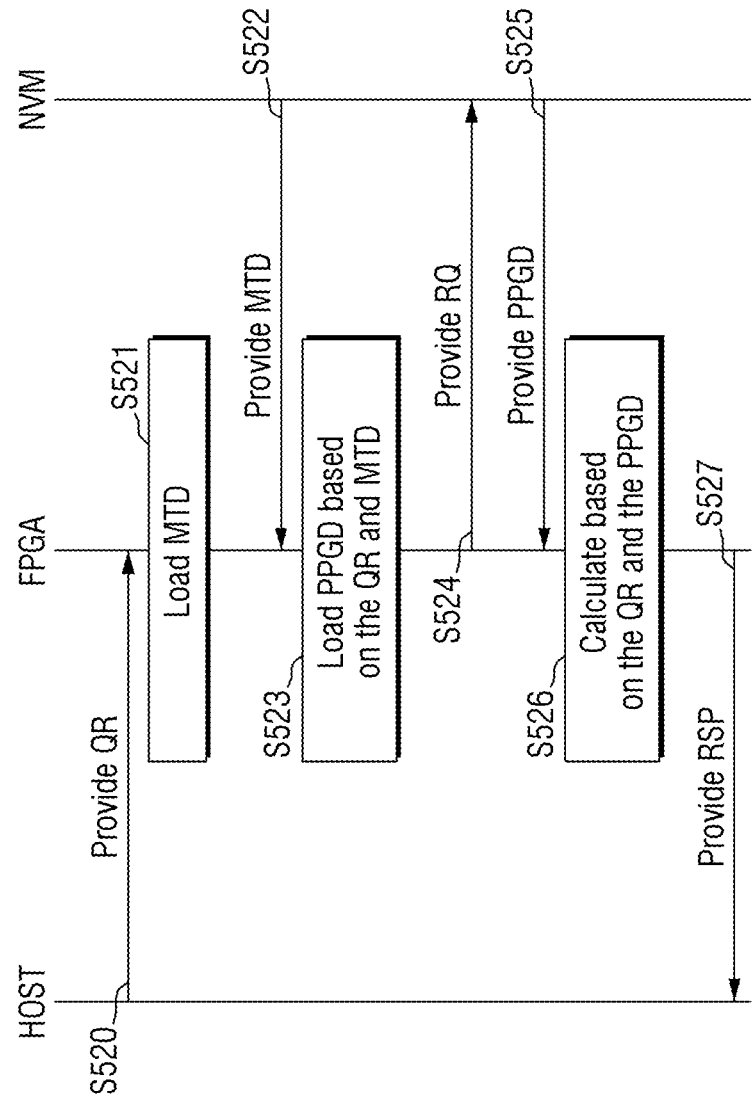
FIG. 14 is a ladder diagram for explaining the operation of the memory system of FIG. 13.
Figure 15:
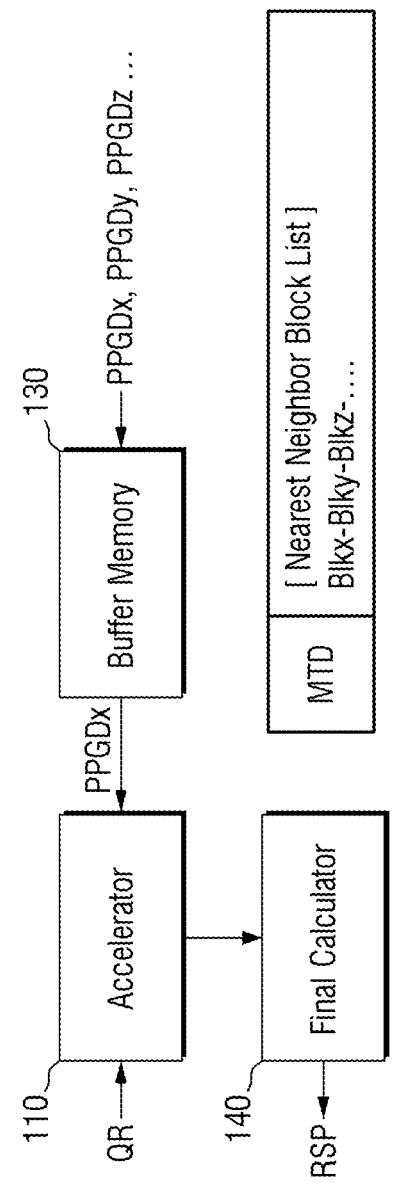
FIG. 15 is a block diagram for explaining the calculation operation of the FPGA of FIG. 13.

FIG. 13 is a block diagram of a memory system that responds to a query according to some example embodiments. FIG. 14 is a ladder diagram for explaining an operation of the memory system of FIG. 13. FIG. 15 is a block diagram for explaining a calculation operation of the FPGA of FIG. 13.

Referring to FIGS. 13 and 14, the host device 20 may provide a query QR to the FPGA 100 (S520). The FPGA 100 may load the metadata MTD in response to the query QR (S521). Therefore, the non-volatile memory 400 may provide the metadata MTD to the FPGA 100 (S522).

The pre-processor 120 may load the pre-processing graph data PPGD on the basis of the query QR and the metadata MTD (S523). For example, the pre-processor 120 may load the corresponding pre-processing graph data PPGD on the basis of the block size included in the metadata MTD, the minimum value, the maximum value and the average value among the data of the pre-processing graph data PPGD, the vector similarity distance between the data blocks, and the like. For example, if the information included in the first metadata MTD1 among a plurality of metadata MTD1 to MTDn has a vector similarity to the query QR, the pre-processor 120 may load the first pre-processing graph data PPGD1 corresponding to the first metadata MTD1. In this case, the pre-processor 120 may load the pre-processing graph data PPGD using the HNSW algorithm described above.

Therefore, the FPGA 100 may provide the request signal RQ to the non-volatile memory 400 (S524), and the non-volatile memory 400 may provide the pre-processing graph data PPGD to the FPGA 100 in response to the request signal RQ (S525).

The FPGA 100 may perform the calculation on the basis of the query QR and the pre-processing graph data PPGD (S526). Here, the accelerator 110 may receive the pre-processing graph data PPGD and perform the calculation thereon.

Referring to FIG. 15, the third buffer memory 130 or the first buffer memory 300 may receive an xth pre-processing graph data PPGDx, an yth pre-processing graph data PPGDy, and a zth pre-processing graph data PPGDz from the non-volatile memory 400. The first buffer memory 300 may buffer the xth pre-processing graph data PPGDx, the yth pre-processing graph data PPGDy, and the zth pre-processing graph data PPGDz. Here, the yth pre-processing graph data PPGDy and the zth pre-processing graph data PPGDz may have nearest vector similarity to the xth pre-processing graph data PPGDx. The information may be recorded in the metadata MTD.

The third buffer memory 130 or the first buffer memory 300 may provide the xth pre-processing graph data PPGDx to the accelerator 110. The accelerator 110 may perform the calculation on the basis of the query QR and the xth pre-processing graph data PPGDx. For example, the accelerator 110 may compare the image vector data of the query QR with the xth pre-processing graph data PPGDx to determine whether they have similarity. The accelerator 110 may perform the calculation using the HNSW algorithm described above.

Subsequently, the accelerator 110 may sequentially receive and process the yth pre-processing graph data PPGDy and the zth pre-processing graph data PPGDz from the third buffer memory 130 or the first buffer memory 300. Here, since the xth pre-processing graph data PPGDx, the yth pre-processing graph data PPGDy, and the zth pre-processing graph data PPGDz have vector proximity by the pre-processor 120, it may be possible to achieve optimization and efficiency of the large amounts of data management of the storage device 10.

The final calculator 140 may receive the information from the accelerator 110, and output a request signal RSP. For example, the final calculator 140 may receive the pre-processing graph data PPGD having the characteristics similar to the query QR and determine it. For example, the characteristics of the pre-processing graph data PPGD corresponding to the query QR may be output. However, this is merely an example of the operations of the final calculator 140 and the accelerator 110. The FPGA 100 may provide a response signal RSP to the host device 20 (S527), and the host device 20 may operate on the basis of the response signal RSP.

Hereinafter, a memory system 2 according to another example embodiment will be described referring to FIG. 16.

Figure 16:
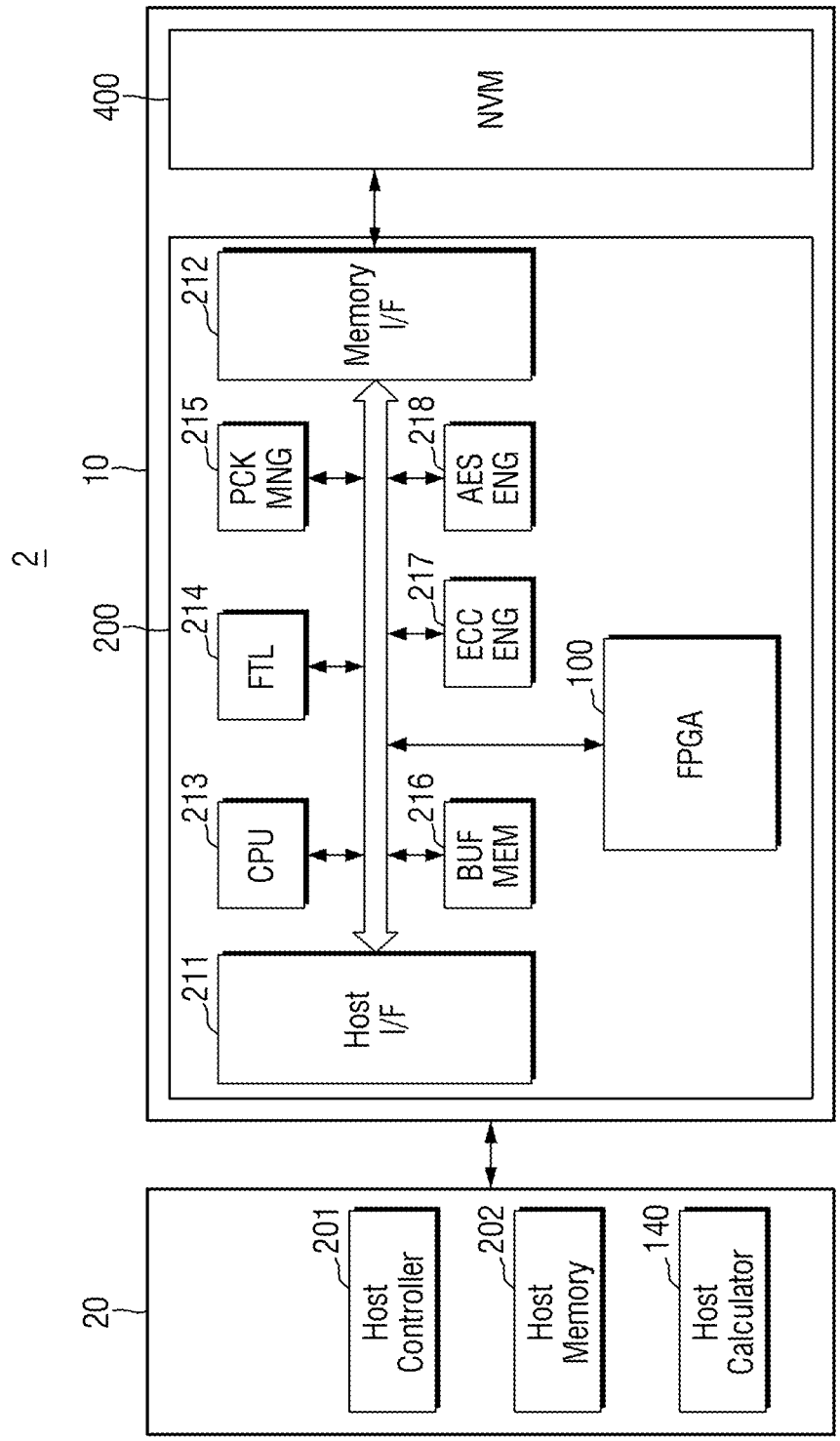
FIG. 16 is a block diagram of the memory system according to some example embodiments.

FIG. 16 is a block diagram of the memory system according to some example embodiments. For convenience of explanation, repeated parts of contents described using FIGS. 1 to 15 will be briefly described or omitted.

Referring to FIG. 16, the memory system 2 may include the storage device 10 and the host device 20.

The storage controller 200 of the storage device 10 may include the FPGA 100. The host device 20 may include the host controller 201, the host memory 202, and the final calculator 140.

The host memory 202 may be provided with final candidate data from the accelerator 110 of the FPGA 100, and temporarily store the final candidate data. That is, the host memory 202 may function as a buffer memory that stores the final candidate data provided from the accelerator 110.

The final calculator 140 may generate final result data using the final candidate data stored in the host memory 202. The final calculator 140 may include a brute-force calculator. The final calculator 140 may include an acceleration circuit for the brute-force calculation. Therefore, the FPGA 100 may not include the final calculator 140 separately. That is, the FPGA 100 may provide the host device 20 with the final candidate data that has not been calculated through the final calculator 140.

Hereinafter, a memory system 3 according to another example embodiment will be described referring to FIG. 17.

Figure 17:
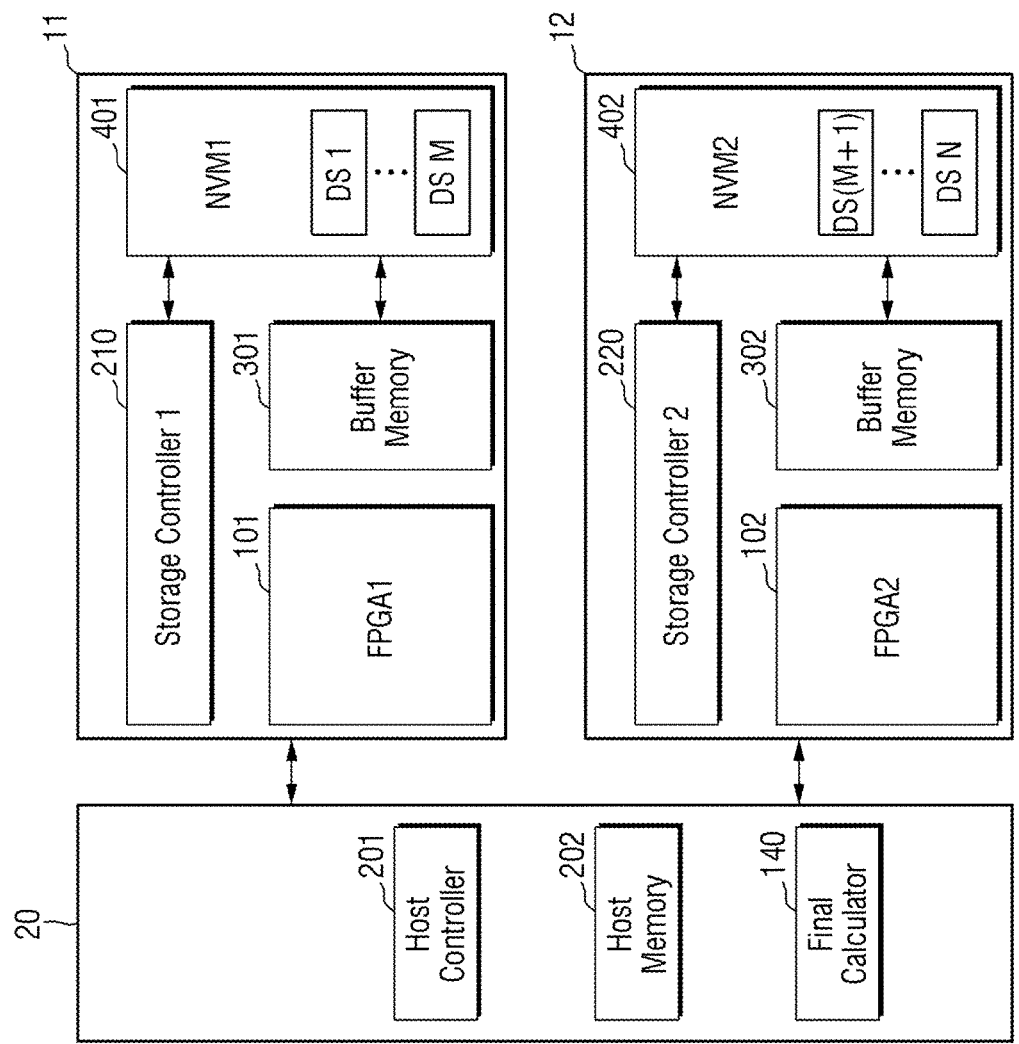
FIG. 17 is a block diagram of the memory system according to some example embodiments.

FIG. 17 is a block diagram of the memory system according to some example embodiments. For convenience of explanation, repeated parts of contents described using FIGS. 1 to 16 will be briefly described or omitted.

Referring to FIG. 17, the memory system 3 may include a first storage device 11, a second storage device 12, and the host device 20.

The first storage device 11 may include a first storage controller 210, a first FPGA 101, a fourth buffer memory 301, and a first non-volatile memory 401.

The first non-volatile memory 401 may store the first data set to the Mth data set DS1 to DSM.

The first FPGA 101 may generate the first data set to the Mth data set DS1 to DSM by performing the pre-processing on the existing stored data set. The first FPGA 101 may perform the calculation process on the first data set to the Mth data set DS1 to DSM on the basis of the first input query. The accelerator included in the first FPGA 101 may generate the first final candidate data using the first data set DS1. The first FPGA 101 may provide the generated first final candidate data to the host device 20.

The second storage device 12 may include a second storage controller 220, a second FPGA 102, a fifth buffer memory 302, and a second non-volatile memory 402.

The second non-volatile memory 402 may store a (M+1)th data set to an Nth data set (DS (M+1) to DS N) different from the first data set to the Mth data set DS1 to DSM.

The second FPGA 102 may generate the (M+1)th data set to the Nth data set (DS (M+1) to DS N) by performing the pre-processing on the existing stored data set. The second FPGA 102 may perform the calculation process on the (M+1)th data set to the Nth data set (DS (M+1) to DS N) on the basis of the second input query. The accelerator included in the second FPGA 102 may generate a second final candidate data using the (M+1)th data set to the Nth data set (DS (M+1) to DS N). The second FPGA 102 may provide the generated second final candidate data to the host device 20.

That is, each of the first FPGA 101 and the second FPGA 102 may perform the calculation in parallel using different data sets on the basis of the same query.

The host memory 202 may function as a buffer memory that temporarily stores the first final candidate data provided from the first FPGA 101 and the second final candidate data provided from the second FPGA 102.

The final calculator 140 included in the host device 20 may generate final result data using the first final candidate data and the second final candidate data stored in the host memory 202. The final calculator 140 may include a brute-force calculator. The final calculator 140 may include an acceleration circuit for the brute-force calculation. Therefore, the first FPGA 101 and the second FPGA 102 may not include the final calculator 140 separately. That is, the first FPGA 101 and the second FPGA 102 may provide the host device 20 with the first and second final candidate data that have not been calculated through the final calculator 140.

Figure 18:
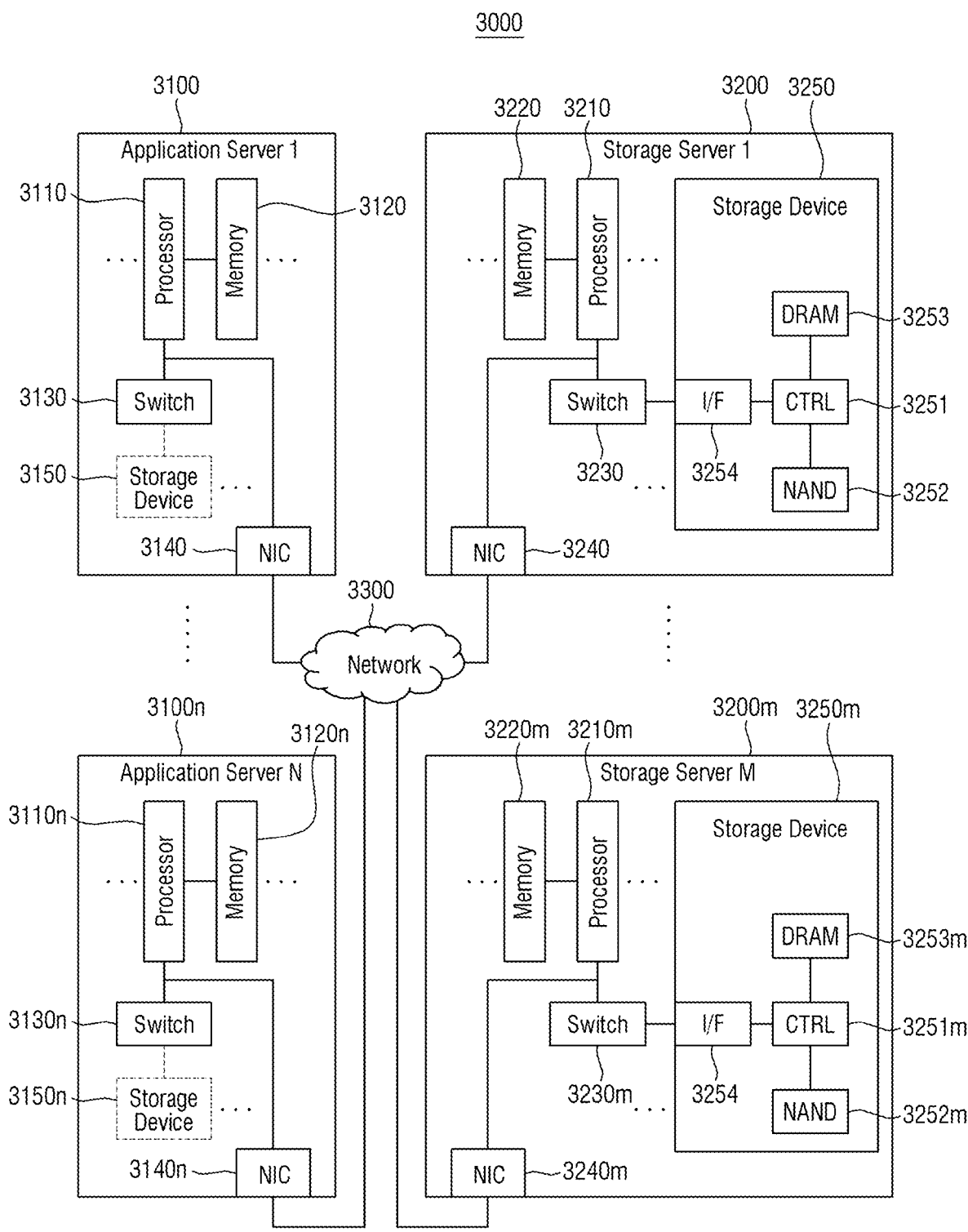
FIG. 18 is a diagram of a data center including the storage device according to some example embodiments.

FIG. 18 is a diagram of a data center including the storage device according to some example embodiments.

Referring to FIG. 18, a data center 3000 may be a facility that gathers various types of data and provides services, and may also be called a data storage center. The data center 3000 may be a system for search engine and database operation, and may be a computing system used in corporations such as banks or government agencies. The data center 3000 may include application servers 3100 to 3100n and storage servers 3200 to 3200m. The number of application servers 3100 to 3100n and the number of storage servers 3200 to 3200m may be variously selected, and the number of application servers 3100 to 3100n and the number of storage servers 3200 to 3200m may be different from each other.

The application server 3100 or the storage server 3200 may include at least one of processors 3110 and 3210 and memories 3120 and 3220. Taking the storage server 3200 as an example, the processor 3210 may control the overall operation of the storage server 3200, and access the memory 3220 to execute command and/or data loaded into the memory 3220. The memory 3220 may be a DDR SDRAM (Double Data Rate Synchronous DRAM), a HBM (High Bandwidth Memory), a HMC (Hybrid Memory Cube), a DIMM (Dual In-line Memory Module), an Optane DIMM or a NVMDIMM (Non-Volatile DIMM). According to an example embodiment, the number of processors 3210 and the number of memories 3220 included in the storage server 3200 may be variously selected. In an example embodiment, the processor 3210 and the memory 3220 may provide a processor-memory pair. In an example embodiment, the number of processors 3210 and the number of memories 3220 may be different from each other. The processor 3210 may include a single core processor or a multi-core processor. The aforementioned explanation of the storage server 3200 is also similarly applicable to the application server 3100. According to example embodiments, the application server 3100 may not include a storage device 3150. The storage server 3200 may include at least one or more storage devices 3250. The number of storage devices 3250 included in the storage server 3200 may be variously selected. The storage device 3250 may include the storage device 10 described referring to FIGS. 1 to 17. That is, the storage device 3250 may organize the data set stored in the non-volatile memory to generate the pre-processing graph data PPGD, by including the FPGA 100.

The application servers 3100 to 3100n and the storage servers 3200 to 3200m may communicate with each other through a network 3300. The network 3300 may be implemented using a FC (Fibre Channel), an Ethernet, or the like. The FC is a medium used for a relatively high-speed data transfer, and may use an optical switch that provides high performance/high availability. The storage servers 3200 to 3200m may be provided as a file storage, a block storage, or an object storage, depending on the access type of the network 3300.

In an example embodiment, the network 1300 may be a storage-only network such as a SAN (Storage Area Network). For example, the SAN may be an FC-SAN which uses an FC network and is implemented according to FCP (FC Protocol). As another example, the SAN may be an IP-SAN which uses a TCP/IP network and is implemented according to an iSCSI (SCSI over TCP/IP or Internet SCSI) protocol. In another example embodiment, the network 1300 may be a general network such as a TCP/IP network. For example, the network 1300 may be implemented according to protocols such as an FCoE (FC over Ethernet), a NAS (Network Attached Storage), and an NVMe-oF (NVMe over Fabrics).

Hereinafter, the application server 3100 and the storage server 3200 will be mainly described. Explanation of the application server 3100 may also be applied to another application server 3100n, and explanation of the storage server 3200 may also be applied to another storage server 3200m.

The application server 3100 may store the data requested to store by a user or client in one of the storage servers 3200 to 3200m through the network 3300. Further, the application server 3100 may acquire the data requested to read by the user or client from one of the storage servers 3200 to 3200m through the network 3300. For example, the application server 3100 may be implemented as a Web server, a DBMS (Database Management System), or the like.

The application server 3100 may access a memory 3120n or a storage device 3150n included in another application server 3100n through the network 3300, or may access the memories 3220 to 3220m or the storage devices 3250 to 3250m included in the storage servers 3200 to 3200m through the network 3300. Accordingly, the application server 3100 may perform various operations on the data stored in the application servers 3100 to 3100n and/or the storage servers 3200 to 3200m. For example, the application server 3100 may execute commands for moving or copying the data between the application servers 3100 to 3100n and/or the storage servers 3200 to 3200m. The data may be moved from the storage devices 3250 to 3250m of the storage servers 3200 to 3200m via the memories 3220 to 3220m of the storage servers 3200 to 3200m, or may be directly moved to the memories 3120 to 3120n of the application servers 3100 to 3100n. Data which moves through the network 3300 may be data encrypted for security or privacy.

Taking the storage server 3200 as an example, an interface 3254 may provide a physical connection between the processor 3210 and a controller 3251, and a physical connection between the NIC (Network InterConnect) 3240 and the controller 3251. For example, the interface 3254 may be implemented in a DAS (Direct Attached Storage) type in which the storage device 3250 is directly connected with a dedicated cable. Further, for example, the interface 3254 may be implemented in various interface types, such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), an SD (secure digital) card, a MMC (multi-media card), an eMMC (embedded multi-media card), a UFS (Universal Flash Storage), an eUFS (embedded Universal Flash Storage), and/or a CF (compact flash) card interface.

The storage server 3200 may further include a switch 3230 and a NIC 3240. The switch 3230 may selectively connect the processor 3210 and the storage device 3250 or may selectively connect the NIC 3240 and the storage device 3250, according to the control of the processor 3210.

In an example embodiment, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a DSP (Digital Signal Processor), a host bus interface, or the like, and may be connected to the processor 3210 and/or the switch 3230, or the like through the host bus interface. The host bus interface may also be implemented as one of the examples of the interface 3254 described above. In an example embodiment, the NIC 3240 may also be integrated with at least one of the processor 3210, the switch 3230, and the storage device 3250.

In the storage servers 3200 to 3200m or the application servers 3100 to 3100n, the processor may transmit the commands to the storage devices 3150 to 3150n and 3250 to 3250m or the memories 3120 to 3120n and 3220 to 3220m to program or read the data. The data may be data in which an error is corrected through an ECC (Error Correction Code) engine. The data may be data subjected to data bus inversion (DBI) or data masking (DM) process, and may include CRC (Cyclic Redundancy Code) information. The data may be data that is encrypted for security or privacy.

The storage devices 3150 to 3150m and 3250 to 3250m may transmit the control signal and command/address signal to the NAND flash memory devices 3252 to 3252m in response to the read command received from the processor. Accordingly, when data is read from the NAND flash memory devices 3252 to 3252m, the RE (Read Enable) signal is input as a data output control signal, and may serve to output the data to the DQ bus. A DQS (Data Strobe) may be generated using the RE signal. Commands and address signals may be latched to the page buffer, depending on a rising edge or a falling edge of a WE (Write Enable) signal.

The controller 3251 may generally control the operation of the storage device 3250. In an example embodiment, the controller 3251 may include a SRAM (Static Random Access Memory). The controller 3251 may write data in the NAND flash 3252 in response to a write command, or may read the data from the NAND flash 3252 in response to a read command. For example, the write command and/or the read command may be provided from the processor 3210 in the storage server 3200, a processor 3210m in another storage server 3200m or the processors 3110 and 3110n in the application servers 3100 and 3100n. A DRAM 3253 may temporarily store (buffer) the data to be written in the NAND flash 3252 or the data read from the NAND flash 3252. Also, the DRAM 3253 may store metadata. Here, the metadata is a user data or data generated by the controller 3251 to manage the NAND flash 3252. The storage device 3250 may include an SE (Secure Element) for security or privacy.

By way of summation and review, there have been increasing attempts to improve the processing speed of electronic devices by combining processors and accelerators. Such attempts have been made in various fields, and much research is being performed on storage devices having an accelerator-based platform, especially in large-capacity storage devices such as an SSD (solid state drive).

As described above, aspects of the present disclosure may provide a storage device having improved performance and efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device, comprising:
a controller configured to receive a pre-processing instruction command from an external device;
a non-volatile memory configured to store an original graph data; and
a buffer memory connected to the controller and the non-volatile memory, wherein:
the controller is configured to:
load the original graph data from the non-volatile memory,
generate pre-processing graph data by classifying the original graph data depending on vector similarity in response to the pre-processing instruction command,
generate metadata on the basis of the pre-processing graph data, and
provide the pre-processing graph data and the metadata to the non-volatile memory,
the non-volatile memory is configured to store the pre-processing graph data and the metadata in a data block, and
the buffer memory is configured to buffer the original graph data, the pre-processing graph data, and the metadata.

2. The storage device as claimed in claim 1, wherein the controller is configured to determine a data capacity for data stored in the data block of the non-volatile memory, on the basis of at least one of a data capacity of the buffer memory and a transfer rate of the original graph data.

3. The storage device as claimed in claim 1, wherein:
the data block includes a first data block and a second data block,
the pre-processing graph data includes a first pre-processing graph data and a second pre-processing graph data, the metadata includes a first metadata and a second metadata, the first pre-processing graph data and the first metadata are stored in the first data block, and the second pre-processing graph data and the second metadata are stored in the second data block.

4. The storage device as claimed in claim 3, wherein the first metadata includes information about the second data block which is nearest to the first data block, and information about a minimum value, a maximum value, and an average value of the first pre-processing graph data.

5. The storage device as claimed in claim 4, wherein the controller is configured to load data stored in the first data block from the non-volatile memory, and load data stored in the second data block from the non-volatile memory, referring to the first metadata.

6. The storage device as claimed in claim 3, wherein a data capacity of the first data block is different from a data capacity of the second data block.

7. The storage device as claimed in claim 3, wherein first vectors included in the first pre-processing graph data and second vectors included in the second pre-processing graph data are classified on the basis of vector distance similarity.

8. The storage device as claimed in claim 1, wherein the controller is configured to:
load the pre-processing graph data stored in the non-volatile memory on the basis of the metadata in response to a query, and
output a response signal by performing a calculation on the basis of the query and the pre-processing graph data.

9. The storage device as claimed in claim 8, wherein the controller is configured to obtain pre-processing graph data which has nearest vector similarity to the query.

10. The storage device as claimed in claim 1, wherein the controller is configured to generate the pre-processing graph data using a hierarchical navigable small world (HNSW) search algorithm.

11. The storage device as claimed in claim 1, wherein the controller includes a field programmable gate array (FPGA) configured to classify the pre-processing graph data and generate the metadata.

12. A storage device, comprising:
a non-volatile memory configured to include a plurality of data blocks and store an original graph data;
a buffer memory configured to buffer the original graph data; and
an FPGA, the FPGA being configured to:
load the original graph data from the buffer memory,
determine a block size of a first data block among the plurality of data blocks of the non-volatile memory on the basis of at least one of a data capacity of the buffer memory and a transfer rate of the original graph data, and
store a first graph data among the original graph data in the first data block.

13. The storage device as claimed in claim 12, wherein:
the FPGA is configured to determine a block size of a second data block different from the first data block, and store a second graph data different from the first graph data among the original graph data in the second data block, and
vectors included in the first graph data and vectors included in the second graph data are classified on the basis of vector distance similarity.

14. The storage device as claimed in claim 13, wherein the FPGA is configured to load the first graph data into the buffer memory in response to a query from an external device, and output a response signal by performing a calculation on the basis of the first graph data and the query.

15. The storage device as claimed in claim 13, wherein:
the FPGA is configured to generate a first metadata on the basis of the first graph data and generate a second metadata on the basis of the second graph data,
the non-volatile memory is configured to store the first metadata in the first data block and store the second metadata in the second data block, and
the FPGA is configured to load the first graph data and the second graph data into the buffer memory on the basis of the first metadata and the second metadata.

16. The storage device as claimed in claim 15, wherein the first metadata includes information about the second data block which is nearest to the first data block, and information about a minimum value, a maximum value, and an average value of the first graph data.

17. A storage device, comprising:
a controller configured to receive a pre-processing instruction command and a query from an external device; and
a non-volatile memory configured to store an original graph data, wherein:
the controller is configured to:
generate a pre-processing graph data and store the pre-processing graph data in the non-volatile memory on the basis of the original graph data in response to the pre-processing instruction command,
load the pre-processing graph data in response to the query, and
output a response signal on the basis of the pre-processing graph data.

18. The storage device as claimed in claim 17, wherein the controller is configured to generate the pre-processing graph data by classifying the original graph data on the basis of vector similarity, generate metadata on the basis of the pre-processing graph data, and store the metadata in the non-volatile memory.

19. The storage device as claimed in claim 18, wherein the controller is configured to load the pre-processing graph data on the basis of the metadata in response to the query.

20. The storage device as claimed in claim 19, wherein the controller is configured to generate the pre-processing graph data using a hierarchical navigable small world (HNSW) search algorithm.

* * * * *